(12) United States Patent
Yoon et al.

(10) Patent No.: US 8,983,451 B2
(45) Date of Patent: Mar. 17, 2015

(54) WIRELESS COMMUNICATION SYSTEMS WITH FEMTO NODES

(75) Inventors: Young C. Yoon, San Diego, CA (US); Srinivasan Balasubramanian, San Diego, CA (US); Peerapol Tinnakornsrisuphap, San Diego, CA (US); Aleksandar M. Gogic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 673 days.

(21) Appl. No.: 12/776,227

(22) Filed: May 7, 2010

(65) Prior Publication Data

US 2010/0285793 A1 Nov. 11, 2010

Related U.S. Application Data

(60) Provisional application No. 61/176,818, filed on May 8, 2009.

(51) Int. Cl.
| | |
|---|---|
| *H04W 4/00* | (2009.01) |
| *H04W 48/16* | (2009.01) |
| H04W 84/04 | (2009.01) |
| H04W 88/10 | (2009.01) |

(52) U.S. Cl.
CPC ............ *H04W 48/16* (2013.01); *H04W 84/045* (2013.01); *H04W 88/10* (2013.01)
USPC .................. 455/422.1; 455/414.1; 455/435.1; 455/435.2; 455/435.3

(58) Field of Classification Search
CPC .... H04W 48/20; H04W 84/045; H04W 88/10
USPC ...................... 455/414.1, 435.1, 435.2, 435.3
See application file for complete search history.

(56) References Cited

U.S. PATENT DOCUMENTS

| | | | |
|---|---|---|---|
| 6,529,491 B1 | 3/2003 | Chang et al. | |
| 2002/0068570 A1* | 6/2002 | Abrol et al. ................... | 455/438 |
| 2004/0110523 A1 | 6/2004 | Ishii | |
| 2005/0005013 A1* | 1/2005 | Saint-Hilaire et al. ........ | 709/227 |
| 2006/0021144 A1 | 2/2006 | Hornbach et al. | |
| 2007/0019586 A1 | 1/2007 | Nanda et al. | |
| 2007/0021126 A1 | 1/2007 | Nanda et al. | |
| 2008/0076398 A1* | 3/2008 | Mate et al. .................. | 455/414.2 |
| 2008/0253550 A1* | 10/2008 | Ch'ng et al. .............. | 379/207.13 |
| 2008/0254792 A1* | 10/2008 | Ch'ng ......................... | 455/435.1 |

(Continued)

FOREIGN PATENT DOCUMENTS

| | | |
|---|---|---|
| CN | 1973561 A | 5/2007 |
| CN | 101189829 A | 5/2008 |

(Continued)

OTHER PUBLICATIONS

International Search Report and Written Opinion—PCT/US2010/034244, International Search Authority—European Patent Office—Aug. 25, 2010.

(Continued)

*Primary Examiner* — Charles Shedrick

(57) ABSTRACT

Systems and methods for storing information in a user zone list are described herein. According to the systems and methods herein, the user zone list includes multiple user zone files and the user zone files include information regarding a communication interface type.

58 Claims, 18 Drawing Sheets

(56) References Cited

U.S. PATENT DOCUMENTS

| | | |
|---|---|---|
| 2009/0052395 A1* | 2/2009 | Bao et al. .................. 370/331 |
| 2009/0082020 A1* | 3/2009 | Ch'ng et al. ............... 455/435.3 |
| 2009/0094351 A1* | 4/2009 | Gupta et al. ............... 709/220 |
| 2009/0094680 A1* | 4/2009 | Gupta et al. ............... 726/3 |
| 2009/0098872 A1* | 4/2009 | Deshpande et al. ....... 455/435.2 |
| 2009/0163202 A1* | 6/2009 | Humblet et al. ........... 455/432.1 |
| 2009/0215452 A1* | 8/2009 | Balasubramanian et al. 455/434 |
| 2009/0245176 A1* | 10/2009 | Balasubramanian et al. 370/328 |
| 2009/0247170 A1 | 10/2009 | Balasubramanian et al. |

FOREIGN PATENT DOCUMENTS

| | | | |
|---|---|---|---|
| EP | 1740001 | A1 | 1/2007 |
| JP | 7143544 | A | 6/1995 |
| JP | 2004194325 | A | 7/2004 |
| JP | 2006245738 | A | 9/2006 |
| JP | 2008301058 | A | 12/2008 |
| KR | 20120013429 | A | 2/2012 |
| KR | 20130140158 | A | 12/2013 |
| WO | WO2008030956 | | 3/2008 |
| WO | WO 2008030956 | A2 * | 3/2008 ............ H04W 48/20 |
| WO | 2008120285 | A1 | 10/2008 |
| WO | WO-2009047308 | A1 | 4/2009 |
| WO | WO2009157972 | | 12/2009 |

OTHER PUBLICATIONS

Tiedemann E.G.,"Femtocell Activities in 3GPP2 TSG-C", Mar. 31, 2009, XP002599307, pp. 18.

Taiwan Search Report—TW099114866—TIPO—Mar. 4, 2014.

* cited by examiner

US 8,983,451 B2

WIRELESS COMMUNICATION SYSTEMS WITH FEMTO NODES

CLAIM OF PRIORITY UNDER 35 U.S.C. §119

The present Application for patent claims priority to U.S. Provisional Application No. 61/176,818, entitled "ENHANCEMENTS FOR SYSTEM SELECTION AND THE PREFERRED USER ZONE LIST (PUZL) FOR ACCESS POINT BASE STATIONS," filed May 8, 2009. The above-referenced application is hereby expressly incorporated by reference herein.

BACKGROUND

1. Field

The present application relates generally to wireless communication, and more specifically to systems and methods for storing information in a user zone list.

2. Description of Related Technology

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In addition to mobile phone networks currently in place, a new class of small base stations has emerged, which may be installed in a user's home and provide indoor wireless coverage to mobile units using existing broadband Internet connections. Such personal miniature base stations are generally known as access point base stations, or, alternatively, Home Node B (HNB) or femto nodes. Typically, such miniature base stations are connected to the Internet and the mobile operator's network via a DSL router or a cable modem. Multiple femto nodes may be deployed by individual users in the coverage area of a traditional macro node. A mobile unit searching for femto nodes, such as for purposes of manual selection of a femto node or hand-off to a femto node, may search for and read system information of a plurality of femto nodes. Due to the large number of nodes in a given area, this may require a significant amount of time, during which the mobile unit's resources are unavailable for other purposes. Increasing the efficiency of the search for and reading of system information of femto nodes is desirable.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include storing a communication interface type and storing information based on the communication interface type.

One aspect of the disclosure is a method of storing information in a user zone list, the method comprising determining, in a wireless device, one or more communication interface types for an access node and storing information regarding the determined communication interface types in a user zone list.

Another aspect of the disclosure is an apparatus for storing information in a user zone list, the apparatus comprising a processor configured to determine one or more communication interface types for an access node and a memory configured to store information regarding the determined communication interface types in a user zone list.

Another aspect of the disclosure is a computer program product comprising a computer readable medium further comprising code for causing a computer to determine one or more communication interface types for an access node and code for causing a computer to store information regarding the determined communication interface types in a user zone list.

Another aspect of the disclosure is an apparatus for storing information in a user zone list, the apparatus comprising means for determining, in a wireless device, one or more communication interface types for an access node and means for storing information regarding the determined communication interface types in a user zone list.

DETAILED DESCRIPTION

Figure 1:
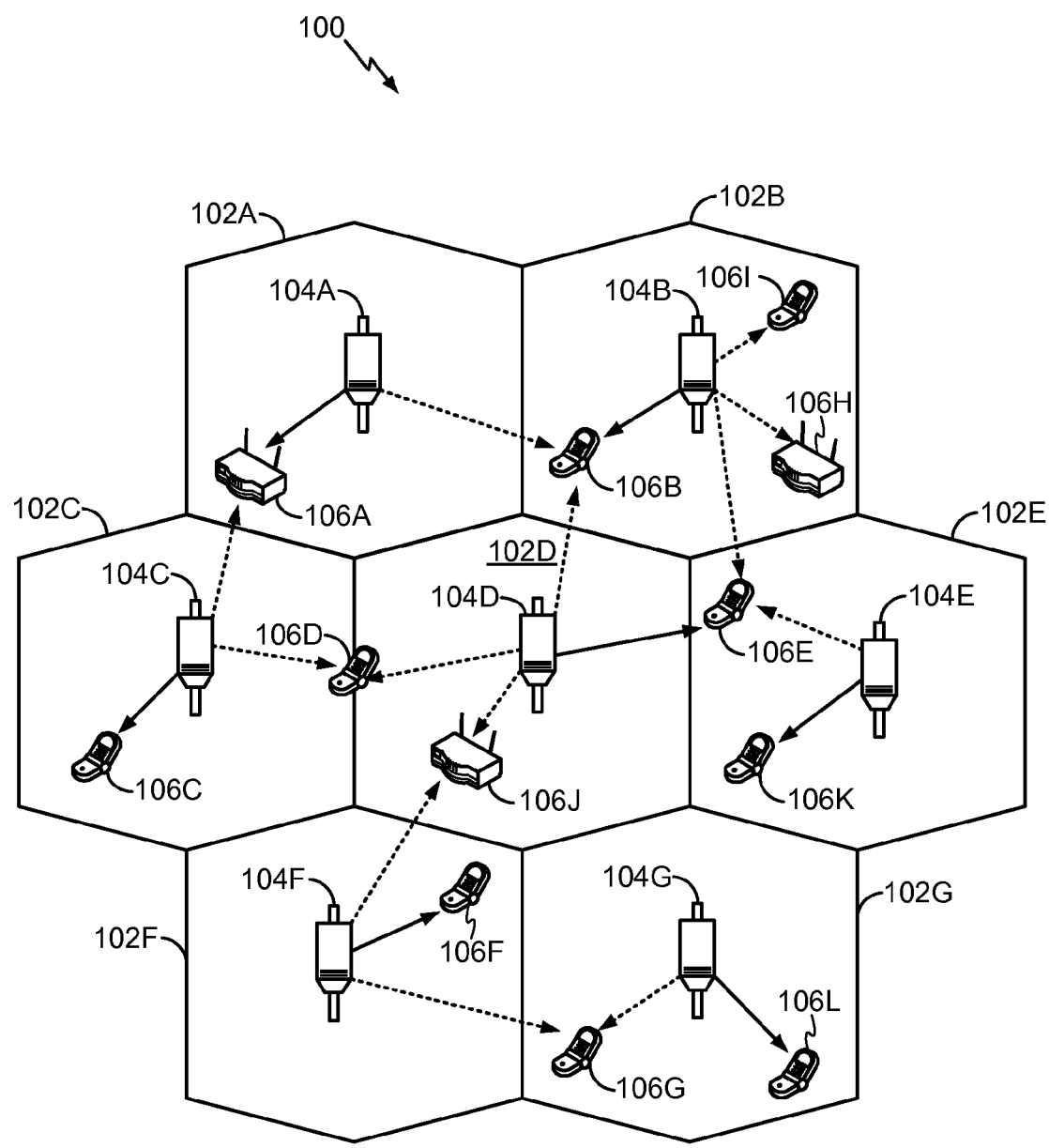
FIG. 1 illustrates an exemplary wireless communication network.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As a user equipment ("UE") moves through such a network, the user equipment may be served in certain locations by access nodes ("ANs") that provide macro coverage while the user equipment may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

FIG. 1 illustrates an exemplary wireless communication network 100. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104, such as, for example, nodes 104a-104g. Each node 104 may provide communication coverage to a corresponding cell 102. The nodes 104 may interact with a plurality of user equipments (UEs), such as, for example, UEs 106a-106l.

Each UE 106 may communicate with one or more nodes 104 on a forward link (FL) and/or a reverse link (RL) at a given moment. A FL is a communication link from a node to a UE. A RL is a communication link from a UE to a node. The nodes 104 may be interconnected, for example, by appropriate wired or wireless interfaces and may be able to communicate with each other. Accordingly, each UE 106 may communicate with another UE 106 through one or more nodes 104. For example, the UE 106j may communicate with the UE 106h as follows. The UE 106j may communicate with the node 104d. The node 104d may then communicate with the node 104b. The node 104b may then communicate with the UE 106h. Accordingly, a communication is established between the UE 106j and the UE 106h.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide a user equipment (UE) 106 access within its coverage area to a communications network, such as, for example the internet or a cellular network.

A UE 106 may be a wireless communication device or apparatus (e.g., a mobile phone, router, personal computer, server, etc.) used by a user to send and receive voice or data over a communications network. A user equipment (UE) may also be referred to herein as an access terminal (AT), as a mobile station (MS), or as a terminal device. As shown, UEs 106a, 106h, and 106j comprise routers. UEs 106b-106g, 106i, 106k, and 106l comprise mobile phones. However, each of UEs 106a-106l may comprise any suitable communication device.

Figure 2:
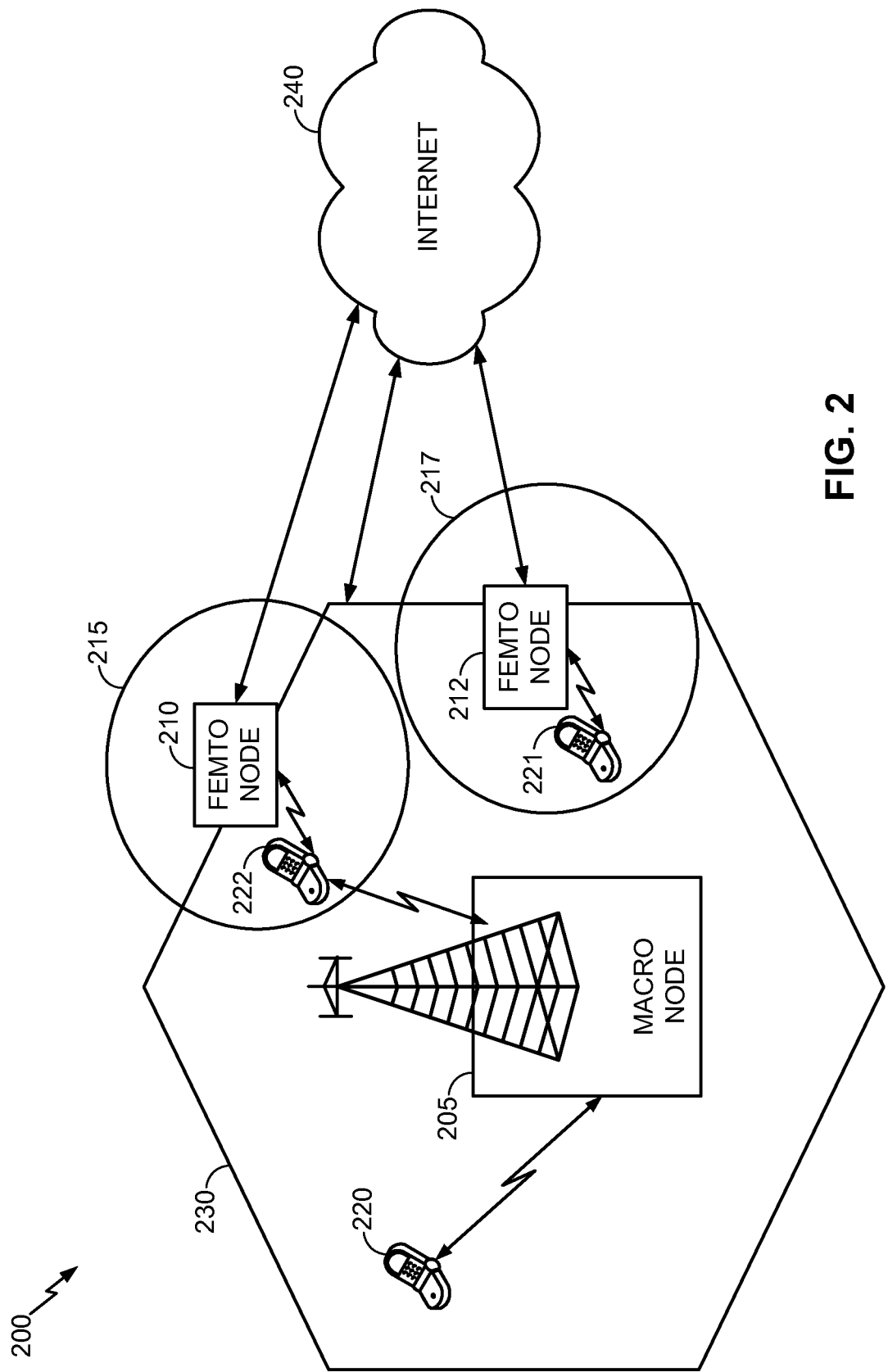
FIG. 2 illustrates exemplary interoperations of two or more communication networks.

FIG. 2 illustrates exemplary interoperations of two or more communication networks. It may be desirable for a UE 220 to transmit information to and receive information from another UE such as UE 221. FIG. 2 illustrates a manner in which the UEs 220, 221, and 222 may communicate with each other. As shown in FIG. 2, the macro node 205 may provide communication coverage to user equipments within a macro area 230. For example, the UE 220 may generate and transmit a message to the macro node 205. The message may comprise information related to various types of communication (e.g., voice, data, multimedia services, etc.). The UE 220 may communicate with the macro node 205 via a wireless link. The macro node 205 may communicate with a network 240 via a wired link or via a wireless link. The femto nodes 210 and 212 may also communicate with the network 240 via a wired link or via a wireless link. The UE 222 may communicate with the femto node 210 via a wireless link and the UE 221 may communicate with the femto node 212 via a wireless link.

The macro node 205 may also communicate with devices such as servers (not shown in FIG. 2) and switching centers (not shown in FIG. 2) through the network 240. For example, the macro node 205 may transmit the message received from the UE 220 to a switching center (not shown in FIG. 2), which may forward the message to another network. The network 240 may also be used to facilitate communication between the UEs 220, 221, and 222. For example, the UE 220 may be in communication with the UE 221. The UE 220 may transmit a message to the macro node 205. The macro node 205 may forward the message to the network 240. The network 240 may forward the messages to the femto node 212. The femto node 212 may forward the message to the UE 221. Similarly, the reverse path may be followed from the UE 221 to the UE 220. In another example, the UE 221 may be in communication with the UE 222. The UE 221 may transmit a message to the femto node 212. The femto node 212 may forward the message to the network 240. The network 240 may forward the message to the femto node 210. The femto node 210 may forward the message to the UE 222. Similarly, the reverse path may be followed from the UE 222 to the UE 221.

In one embodiment, the femto nodes 210, 212 may be deployed by individual consumers and placed in homes, apartment buildings, office buildings, and the like. The femto nodes 210, 212 may communicate with the UEs in a predetermined range (e.g., 100 m) of the femto nodes 210, 212 utilizing a predetermined cellular transmission band. In one embodiment, the femto nodes 210, 212 may communicate with the network 240 by way of an Internet Protocol (IP) connection, such as a digital subscriber line (DSL, e.g., including asymmetric DSL (ADSL), high data rate DSL (HDSL), very high speed DSL (VDSL), etc.), a TV cable carrying Internet Protocol (IP) traffic, a broadband over power line (BPL) connection, or other link.

The network 240 may comprise any type of electronically connected group of computers and/or devices including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), or Bluetooth (IEEE 802.15.1). Note that computing devices may be desktop, server, portable, hand-held, set-top, or any other desired type of configuration. As used herein, the network 240 includes network variations such as the public Internet, a private network within the Internet, a secure network within the Internet, a private network, a public network, a value-added network, an intranet, and the like. In certain embodiments, network 240 may also comprise a virtual private network (VPN).

Figure 3:
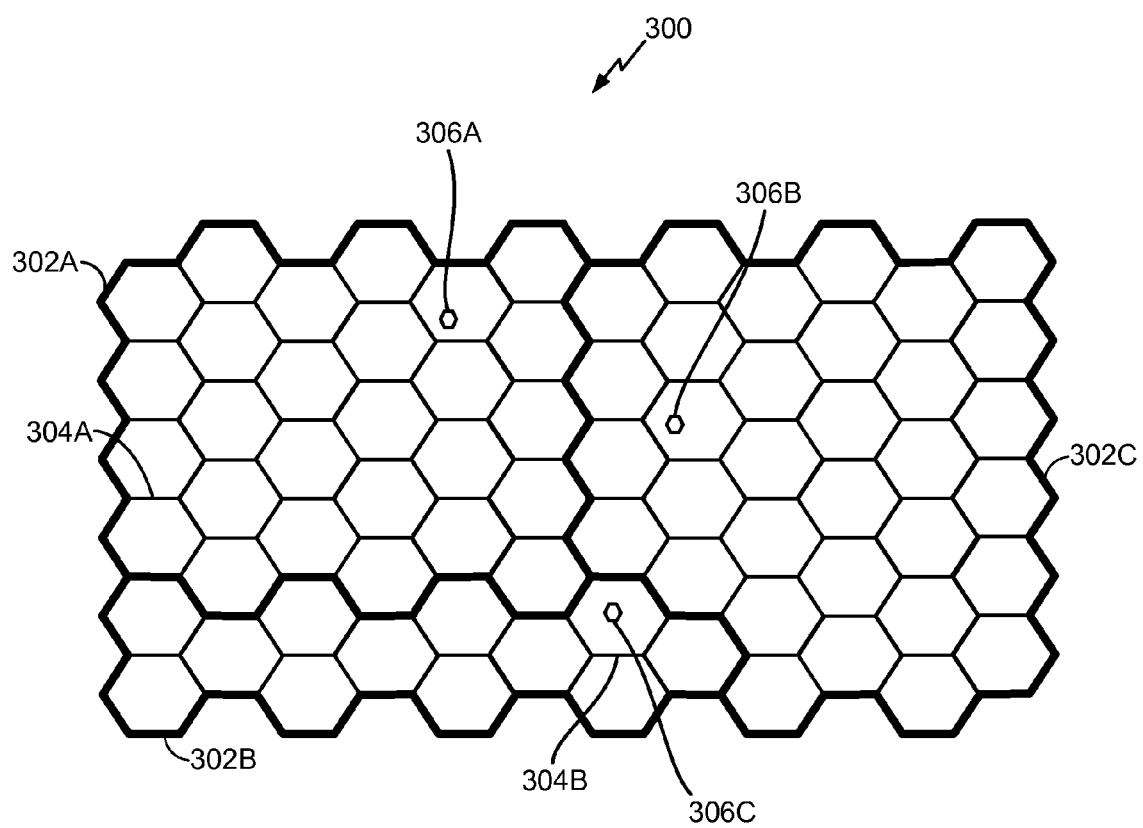
FIG. 3 illustrates exemplary coverage areas of the wireless communication networks shown in FIGS. 1 and 2.

FIG. 3 illustrates exemplary coverage areas of the wireless communication networks 100 and 200 shown in FIGS. 1 and 2. The coverage area 300 may comprise one or more geographical areas in which the UE 220 may access the communication network 240 as discussed above with respect to FIG. 2. As shown the coverage area 300 comprises several tracking areas 302 (or routing areas or location areas). Each tracking area 302 comprises several macro areas 304, which may be similar to the macro area 230 described above with respect to FIG. 2. Here, areas of coverage associated with tracking areas 302A, 302B, and 302C are shown as delineated by wide lines as and the macro areas 304 are represented by hexagons. The tracking areas 302 may also comprise femto areas 306, which may be similar to the femto area 230 described above with respect to FIG. 2. In this example, each of the femto areas 306 (e.g., femto area 306C) is depicted within a macro area 304 (e.g., macro area 304B). It should be appreciated, however, that a femto area 306 may not lie entirely within a macro area 304. In practice, a large number of femto areas 306 may be defined with a given tracking area 302 or macro area 304.

Also, one or more pico areas (not shown) may be defined within a given tracking area 302 or macro area 304.

Referring again to FIG. 2, the owner of the femto node 210 may subscribe to a mobile service, such as, for example, 3 G mobile service, offered through the communication network 240 (e.g., a mobile operator core network). In addition, a user equipment 221 may be capable of operating both in macro environments (e.g., macro areas) and in smaller scale (e.g., residential, femto areas, pico areas, etc.) network environments. In other words, depending on the current location of the user equipment 221, the user equipment 221 may access the communication network 240 by a macro node 205 or by any one of a set of femto nodes (e.g., femto nodes 210, 212). For example, when a subscriber is outside his home, he may be served by a macro node (e.g., node 205) and when the subscriber is at home, he may be served by a femto node (e.g., node 210). It should further be appreciated that the femto nodes 210 may be backward compatible with existing user equipments 221.

The femto node 210 may communicate over a single frequency or, in the alternative, over multiple frequencies. Depending on the particular configuration, the single frequency or one or more of the multiple frequencies may overlap with one or more frequencies used by a macro node (e.g., node 205).

In one embodiment, a user equipment 221 may be configured to connect to a particular (e.g., preferred) femto node (e.g., a home femto node of the user equipment 221) whenever the user equipment 221 is within communication range of the femto node. For example, the user equipment 221 may communicate with only the femto node 210 when the user equipment 221 is within the femto area 215.

In another embodiment, the user equipment 221 is communicating with a node but is not communicating with a preferred node (e.g., as defined in a preferred roaming list). In this embodiment, the user equipment 221 may continue to search for a preferred node (e.g., the preferred femto node 210) using a Better System Reselection ("BSR"). The BSR may comprise a method comprising a periodic scanning of available systems to determine whether better systems are currently available. The BSR may further comprise attempting to associate with available preferred systems. The user equipment 221 may limit the BSR to scanning over one or more specific bands and/or channels. Upon discovery of a preferred femto node 210, the user equipment 221 selects the femto node 210 for communicating with to access the communication network 240 within the femto area 215.

For example, when the UE 221, which may be communicating with the macro node 205, gets close to the femto node 210, it may handoff (i.e., idle or active handoff) to the femto node 210. Accordingly, the UE 222 begins communicating with the femto node 210. In mobile networks such as 1xRTT, 1xEV-DO, WCDMA, HSPA, etc., when a user equipment gets close to a node, there are mechanisms to trigger the handoff. For example, each node (e.g., femto node, macro node, etc.) may be configured to generate and transmit a beacon. The beacon may comprise pilot channels and other overhead channels. Further, the beacon may be transmitted on multiple frequencies such that UEs operating on different frequencies can detect the beacon. The UE may use the beacon received from a node to identify the node for purposes of performing a handoff.

A user equipment (e.g., UE 220, 221, 222) may need to uniquely identify a femto node to determine whether or not to communicate with the femto node to access the communication network 240. For example, before the UE 221 can communicate with the femto node 210, it must be able to differentiate the femto node 210 from other nodes in the area. By identifying the femto node 210 uniquely, the UE 221 can appropriately direct communications to the femto node 210 and identify communications as originating from the femto node 210.

In one embodiment, a UE may uniquely identify a femto node by detecting a beacon comprising pilot signals transmitted from the femto node. The pilot signals may uniquely identify the femto nodes from which they were transmitted. For example, femto nodes 210 and 212 may each transmit a different pilot signal (e.g., pilot signal A and pilot signal B). The UE 221 may receive both pilot signals from each of the femto nodes 210 and 212. The UE 221 may then generate a pilot strength measurement report (PSMR). The PSMR may comprise the received pilot signals. The PSMR may further comprise the signal strength ($E_{cp}/I_o$) of the pilot signals. The UE 221 may transmit the PSMR in a measurement report message (MRM) to the macro node 205 with which it is communicating.

The macro node 205 may access information (e.g., a database) that maps the pilot signal to the femto node. In one embodiment, the information mapping pilot signals to nodes may be stored at the macro node 205. In another embodiment, the macro node 205 may access a server on the network 240 which includes the information mapping pilot signals to nodes. In one embodiment, if the UE 221 is provisioned to communicate with the identified femto node, the macro node 205 may direct the UE 221 to handoff to the identified femto node. In another embodiment, the macro node 205 further determines if the signal strength of the pilot signal is above a threshold level before directing a handoff.

In one embodiment, each pilot signal comprises a physical layer identifier, such as a pseudo noise (PN) code with different offsets or a set of unique PN codes. The PN code and/or the offset may comprise a code or sequence of numbers (e.g., chips) that identifies the node and/or the node type (e.g., femto node, macro node, pico node). The PN code may comprise a PN short code with a PN offset applied. The PN offset may indicate the delay from the true network synchronization time applied to a PN short code. In one embodiment, all of the nodes may use the same PN short code. However, a different PN offset may be applied to the PN short code for different nodes. Thus, the PN offset directly correlates to the offset PN short code and the terms "PN offset" and "offset PN short code" may be used interchangeably herein. For LTE systems, the identifier is referred to as a 'Physical Cell Identifier'.

In one embodiment, the increment of delay between each PN offset is 64 chips. This ensures that received pilot signals are distinguishable. For example, when sending a pilot signal between the femto node 210 and the UE 221, there may be delay in the signal due to propagation delay over the communication path between the femto node 210 and the UE 221. Therefore a pilot signal with a PN offset of 64 sent by the femto node 210 may be delayed by 2 chips due to propagation delay and may be received as a PN offset of 66 by the UE 221. The UE 221 may search in a search window around the expected PN offset value to detect delayed pilot signals. For example, the UE 221 may have a search window of ±10 chips around the PN offset 64 to detect a delayed pilot signal. Since the offset of 66 is closer to the offset of 64 than any other pilot signal, it is safe to assume that the original pilot signal was sent with an offset of 64. Accordingly, by separating each pilot signal by at least 64 chips, small delays due to propagation delay do not affect detection of the pilot signal or identification of the transmitting node.

In one embodiment, the PN offset may be used to identify the type of node (e.g., femto node, macro node, pico node) transmitting signals. For example, a particular set of PN offsets may be reserved for identifying femto nodes. However, the number of PN offsets available for use may be smaller than the number of femto nodes within a geographic area. Thus the PN offset alone may not be sufficient to uniquely identify a femto node. For example, 6 unique PN offsets may be set aside for use by femto nodes. However, there may be more than 6 femto nodes deployed within the macro area 230. As a result, identifying each femto node using a single pilot signal with a given PN offset may not be sufficient to uniquely identify the femto node.

In one embodiment, a node may only provide certain services to certain user equipments with which it is provisioned to communicate. Such a node may be referred to as a "restricted" or "closed" node. In wireless communication networks comprising restricted femto nodes, a given user equipment may only be served by macro nodes and a defined set of femto nodes (e.g., the femto node 210). In other embodiments, a node may be restricted to not provide at least one of: signaling, data access, registration, paging, or service.

In one embodiment, a restricted femto node (which may also be referred to as a Closed Subscriber Group Home NodeB) is one that provides service to a restricted provisioned set of user equipments. This set may be temporarily or permanently changed to include additional or fewer user equipments as necessary. In some aspects, a Closed Subscriber Group ("CSG") may be defined as the set of access nodes (e.g., femto nodes) that share a common access control list of user equipments (e.g., a list of the restricted provisioned set of user equipments). A channel on which all femto nodes (or all restricted femto nodes) in a region operate may be referred to as a femto channel.

Various relationships may thus exist between a given femto node and a given user equipment. For example, from the perspective of a user equipment, an open femto node may refer to a femto node with no restricted association. A restricted or closed femto node may refer to a femto node that is restricted in some manner (e.g., restricted for association and/or registration). A hybrid femto node may refer to a femto node where a limited amount of the femto nodes resources are available to all users, while the rest are operated in a restricted manner. A home femto node may refer to a femto node on which the user equipment is subscribed to/authorized to access and operate on. A guest femto node may refer to a femto node on which a user equipment is temporarily subscribed to/authorized to access or operate on. An alien femto node may refer to a femto node on which the user equipment is not authorized to access or operate on, except for perhaps emergency situations (e.g., 911 calls).

From a restricted femto node perspective, a home user equipment may refer to a user equipment that is subscribed to/authorized to access the restricted femto node. A guest user equipment may refer to a user equipment with temporary subscription/access to the restricted femto node. An alien user equipment may refer to a user equipment that does not have permission to access the restricted femto node, except for perhaps emergency situations, such as 911 calls.

In order to determine whether or not UE 221 is allowed to access the femto node 210, the UE 221 may read L3 overhead messages such as system information broadcasts (SIBs) of the femto node 210, which the femto node 210 may periodically broadcast. The system information may include identity information such as a CSG ID and/or a cell ID, which uniquely identify the femto node 210. The system information may further include an indicator of the access mode of the femto node 210 (e.g., closed, open, or hybrid). Accordingly, the UE 221 can determine whether it can access the femto node 210 and also how to uniquely identify the femto node 210.

In some embodiments each UE (e.g., UE 221) has information regarding the physical layer identifiers (e.g., primary scrambling codes (PSCs), physical cell identifiers (PCIs), PN offsets, etc.) reserved for use by femto nodes (e.g., femto node 210) on one or more frequencies. The information may comprise one or more physical identifier lists such as one or more PSC lists comprising physical layer identifiers that are reserved for use by femto nodes on one or more frequencies. The physical identifier list may further comprise the frequency of each of the femto nodes associated with the physical layer identifiers of the femto nodes. In one embodiment, a physical layer identifier list is unique to a particular frequency and lists the physical identifiers of femto nodes associated with only one frequency. In another embodiment, the physical identifier list lists the physical identifiers of femto nodes for all frequencies over which the UE 221 communicates.

The UE 221 may receive the physical identifier list from a node such as the macro node 205 or the femto node 210 when the UE 221 is in a standby or idle mode where it is not actively communicating such as in a voice call. In another embodiment, the UE 221 may be programmed (e.g., provisioned) with the physical identifier list. In one embodiment, the physical identifiers listed in a physical identifier list broadcast by the macro node 205 are of femto nodes communicating over the same frequency as the macro node 205 broadcast the list. In another embodiment, the physical identifiers listed in a physical identifier list broadcast by the macro node 205 are of femto nodes for all frequencies over which the UE 221 communicates.

Using the physical identifier list, the UE 221 searching for a femto node may read SIBs of only femto nodes, by only reading SIBs of nodes with a physical layer identifier on the physical layer identifier list and avoiding reading SIBs of other types of nodes. Certain resources (e.g., a transceiver, a processor, etc.) of the UE 221 may be used for reading SIBs. During this time, the UE 221 may be unable to use such resources for other purposes, such as receiving paging messages. Therefore, by utilizing the physical identifier list can save the UE 221 time in searching for femto nodes and free up resources for additional purposes.

In one embodiment, the UE 221 can use the physical identifier list to speed up the time it takes to search for femto nodes, which allows for example, a user of the UE 221 to view details of femto nodes more quickly, such as for a manual selection of a femto node. The UE 221 may have one or more physical identifier lists received from one or more macro nodes. A user of the UE 221 may initiate a manual femto node selection procedure on the UE 221. During this time, the UE 221 may be in an idle mode where it is not in active communication (e.g., a voice call) with a node. The UE 221 may use the physical identifier lists to determine over which frequencies femto nodes are communicating. The UE 221 may scan only the frequencies with femto nodes and ignore scanning frequencies without femto nodes. For example, there may be femto nodes communicating on frequencies F1 and F2, but not on frequency F3. Accordingly, the UE 221 may perform a scan of F1 and F2, but not F3 for physical identifiers. During the scan, the UE 221 may detect physical identifiers for one or more nodes on the frequencies scanned. Using the physical identifier list, the UE 221 determines which detected physical identifiers are associated with femto nodes. The UE 221 then reads SIBs from only the detected physical identifiers associated with femto nodes. In another embodiment, the UE 221 reads SIBs from only the detected physical identifiers associated with femto nodes that transmit the SIBs with a sufficiently strong signal-to-noise ratio (SNR) (e.g., a SNR above a threshold level) that the UE 221 determines is sufficient for communication. The UE 221 may then display information related to the femto nodes for which SIBs were read to a user on a display of the UE 221. The information related to the femto nodes may include any combination of an identity of the femto nodes, a name of the femto node, an access mode of the femto node, signal strength of the femto node, etc. A user of the UE 221 may use this information to select a femto node to communicate with, such as by handing-off to the selected femto node.

The UE 221 may further use the physical identifier list to more efficiently perform an active hand-in from one node to another node. For example, the UE 221 may be in an active mode, such as actively in a call with another UE and in communication with the macro node 205 over frequency F1. A controller, such as the macro node 205, on the communication network 240 may instruct the UE 221 to perform an intra-frequency search for neighboring nodes to hand-in. The UE 221 may scan frequency F1 to detect physical layer identifiers transmitted by nodes within communication distance of the UE 221. The UE 221 may then use the physical layer identifier list to selectively read the SIBs of one or more of the detected nodes. In one embodiment, if the UE 221 does not have a subscription to a femto node, the UE 221 may avoid reading the SIBs of nodes with physical identifiers that are associated with femto nodes. If the UE 221 does have a subscription to a femto node and is configured to hand-in to any type of node, the UE 221 may read the SIBs of all nodes. In one embodiment, if the UE 221 has a subscription to a femto node and is configured to hand-in to only a femto node, the UE 221 may read the SIBs of only femto nodes. In another embodiment, if the UE 221 has a subscription to a femto node and is configured to hand-in to only a femto node, the UE 221 may read only the SIBs of femto nodes with physical layer identifiers that match the physical layer identifiers of femto nodes for which the UE 221 has a subscription. For the above embodiments the UE 221 may further read SIBs from only the detected physical identifiers associated with femto nodes that transmit the SIBs with a sufficiently strong signal-to-noise ratio (SNR) (e.g., a SNR above a threshold level) that the UE 221 determines is sufficient for communication. Utilizing the SIBs of the femto nodes, the UE 221 can determine whether or not it is subscribed with each of the femto nodes. In some embodiments, the UE 221 then reports the nodes detected to the macro node 205. In one embodiment, the UE 221 reports all of the nodes detected to the macro node 205. In another embodiment, the UE 221 reports only femto nodes and/or macro nodes with which the UE 221 is authorized to access. The macro node 205 may then facilitate active handover to one of the reported nodes. For example, the macro node 205 may direct the UE 221 to handover to the node from which the UE 221 receives a signal with the highest signal-to-noise ratio that the UE 221 is authorized to access. One of ordinary skill in the art should recognize that the above described embodiment could similarly be used for active hand-in from a femto node to another femto node.

In another embodiment, the UE 221 may further use the physical identifier list to more efficiently perform a cell reselection. For example, the UE 221 may be in idle mode and camping on the macro node 205 over a frequency F1. The UE 221 may then determine it needs to perform a cell reselection and camp on a different node. For example, the signal conditions between the UE 221 and the macro node 205 may degrade. Accordingly, the UE 221 may scan one or more frequencies for a node to camp on. The UE 221 may perform idle handoff (e.g., cell reselection) and handoff from the macro node 205 to the other node to camp on. In one embodiment, the UE 221 may only scan frequencies other than the frequency F1 over which the macro node 205 communications. In another embodiment, the UE 221 may only scan the same frequency F1 over which the macro node 205 communicates. In yet another embodiment, the UE 221 may scan only the frequencies with femto nodes and ignore scanning frequencies without femto nodes. For example, there may be femto nodes communicating on frequencies F1 and F2, but not on frequency F3, according to the physical identifier list. Accordingly, the UE 221 may perform a scan of F1 and F2, but not F3 for physical identifiers. During the scan, the UE 221 may detect physical identifiers for one or more nodes on the frequencies scanned.

As part of the cell reselection process, the UE 221 may then use the physical layer identifier list to selectively read the SIBs of one or more of the detected nodes. If the UE 221 does not have a subscription to a femto node, the UE 221 may avoid reading the SIBs of nodes with physical identifiers that are associated with femto nodes. If the UE 221 does have a subscription to a femto node and is configured to handoff to any type of node, the UE 221 may read the SIBs of all nodes. In one embodiment, if the UE 221 has a subscription to a femto node and is configured to handoff to only a femto node, the UE 221 may read the SIBs of only femto nodes. In another embodiment, if the UE 221 has a subscription to a femto node and is configured to handoff to only a femto node, the UE 221 may read only the SIBs of femto nodes with physical layer identifiers that match the physical layer identifiers of femto nodes for which the UE 221 has a subscription. For the above embodiments the UE 221 may further read SIBs from only the detected physical identifiers associated with femto nodes that transmit the SIBs with a sufficiently strong signal-to-noise ratio (SNR) (e.g., a SNR above a threshold level) that the UE 221 determines is sufficient for communication. Utilizing the SIBs of the femto nodes, the UE 221 can determine whether or not it is subscribed with each of the femto nodes. The UE 221 may then perform a cell reselection to an appropriate node based on the SIBs read by the UE 221. One of ordinary skill in the art should recognize that the above described embodiment could similarly be used for idle handoff from a femto node to another femto node.

For convenience, the disclosure herein describes various functionalities related to a femto node. It should be appreciated, however, that a pico node may provide the same or similar functionality for a larger coverage area. For example, a pico node may be restricted, a home pico node may be defined for a given user equipment, and so on.

A wireless multiple-access communication system may simultaneously support communication for multiple wireless user equipments. As mentioned above, each user equipment may communicate with one or more nodes via transmissions on the forward and reverse links. The forward link (or downlink) refers to the communication link from the node to the user equipment, and the reverse link (or uplink) refers to the communication link from the user equipment to the node. This communication link may be established via a single-in-single-out system, a multiple-in-multiple-out ("MIMO") system, or some other type of system.

A MIMO system employs multiple (NT) transmit antennas and multiple (NR) receive antennas for data transmission. A MIMO channel formed by the NT transmit and NR receive antennas may be comprise NS independent channels, which are also referred to as spatial channels, where NS≤min {NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables a device (e.g., a node, a user equipment, etc.) to extract a transmit beam-forming gain on the forward link when multiple antennas are available at the device.

Figure 4:
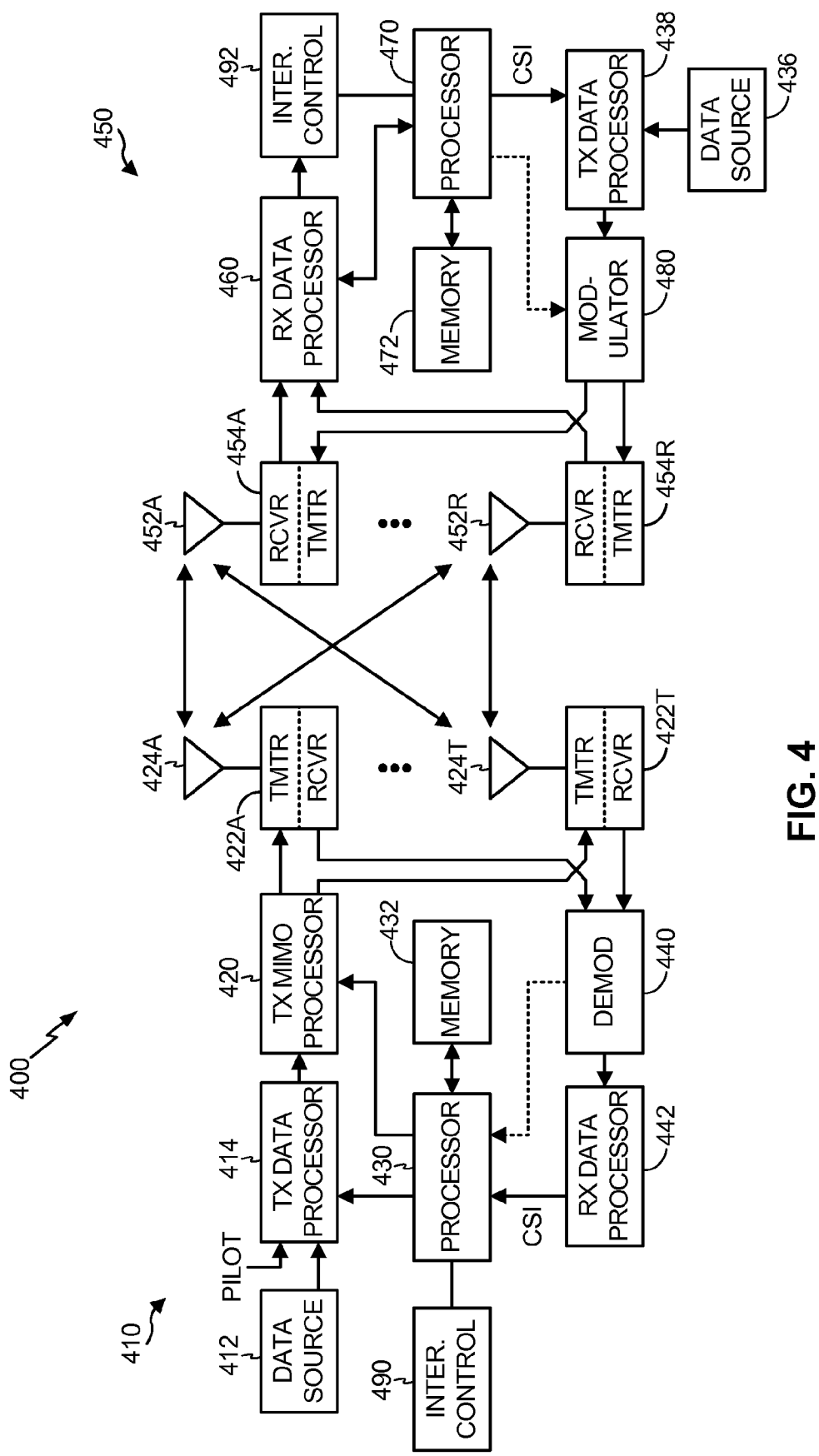
FIG. 4 is a functional block diagram of an exemplary femto node and an exemplary user equipment in one of the communication networks of FIG. 2.

The teachings herein may be incorporated into a device (e.g., a node, a user equipment, etc.) employing various components for communicating with at least one other device. FIG. 4 is a functional block diagram of a first exemplary femto node 410 and a first exemplary user equipment 450 in one of the communication networks of FIG. 2. As shown, a MIMO system 400 comprises a femto node 410 and a user equipment 450 (e.g., the UE 222). At the femto node 410, traffic data for a number of data streams is provided from a data source 412 to a transmit ("TX") data processor 414.

In one embodiment, each data stream is transmitted over a respective transmit antenna. The TX data processor 414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 430. A data memory 432 may store program code, data, and other information used by the processor 430 or other components of the femto node 410.

The modulation symbols for all data streams are then provided to a TX MIMO processor 420, which may further process the modulation symbols (e.g., for OFDM). The TX MIMO processor 420 then provides NT modulation symbol streams to NT transceivers ("XCVR") 422A through 422T. In some aspects, the TX MIMO processor 420 applies beam-forming weights to the symbols of the data streams and to the antenna from which the symbol is being transmitted.

Each transceiver 422 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 422A through 422T are then transmitted from NT antennas 424A through 424T, respectively.

At the femto node 450, the transmitted modulated signals are received by NR antennas 452A through 452R and the received signal from each antenna 452 is provided to a respective transceiver ("XCVR") 454A through 454R. Each transceiver 454 conditions (e.g., filters, amplifies, and downconverts) a respective received signal, digitizes the conditioned signal to provide samples, and further processes the samples to provide a corresponding "received" symbol stream.

A receive ("RX") data processor 460 then receives and processes the NR received symbol streams from NR transceivers 454 based on a particular receiver processing technique to provide NT "detected" symbol streams. The RX data processor 460 then demodulates, deinterleaves, and decodes each detected symbol stream to recover the traffic data for the data stream. The processing performed by the RX data processor 460 is complementary to that performed by the TX MIMO processor 420 and the TX data processor 414 at the femto node 410.

A processor 470 periodically determines which pre-coding matrix to use (discussed below). The processor 470 formulates a reverse link message comprising a matrix index portion and a rank value portion. A data memory 472 may store program code, data, and other information used by the processor 470 or other components of the femto node 450.

The reverse link message may comprise various types of information regarding the communication link and/or the received data stream. The reverse link message is then processed by a TX data processor 438. The TX data processor 438 also receives traffic data for a number of data streams from a data source 436. The modulator 480 modulates the data streams. Further, the transceivers 454A through 454R condition the data streams and transmits the data streams back to the femto node 410.

At the femto node 410, the modulated signals from the femto node 450 are received by the antennas 424. Further, the transceivers 422 condition the modulated signals. A demodulator ("DEMOD") 440 demodulates the modulated signals. A RX data processor 442 processes the demodulated signals and extracts the reverse link message transmitted by the femto node 450. The processor 430 then determines which pre-coding matrix to use for determining the beam-forming weights. Further, the processor 430 processes the extracted message.

Further, the femto node 410 and/or the femto node 450 may comprise one or more components that perform interference control operations as taught herein. For example, an interference ("INTER") control component 490 may cooperate with the processor 430 and/or other components of the femto node 410 to send/receive signals to/from another device (e.g., femto node 450) as taught herein. Similarly, an interference control component 492 may cooperate with the processor 470 and/or other components of the femto node 450 to send/receive signals to/from another device (e.g., femto node 410). It should be appreciated that for each femto node 410 and 450 the functionality of two or more of the described components may be provided by a single component. For example, a single processing component may provide the functionality of the interference control component 490 and the processor 430. Further, a single processing component may provide the functionality of the interference control component 492 and the processor 470.

Figure 5A:
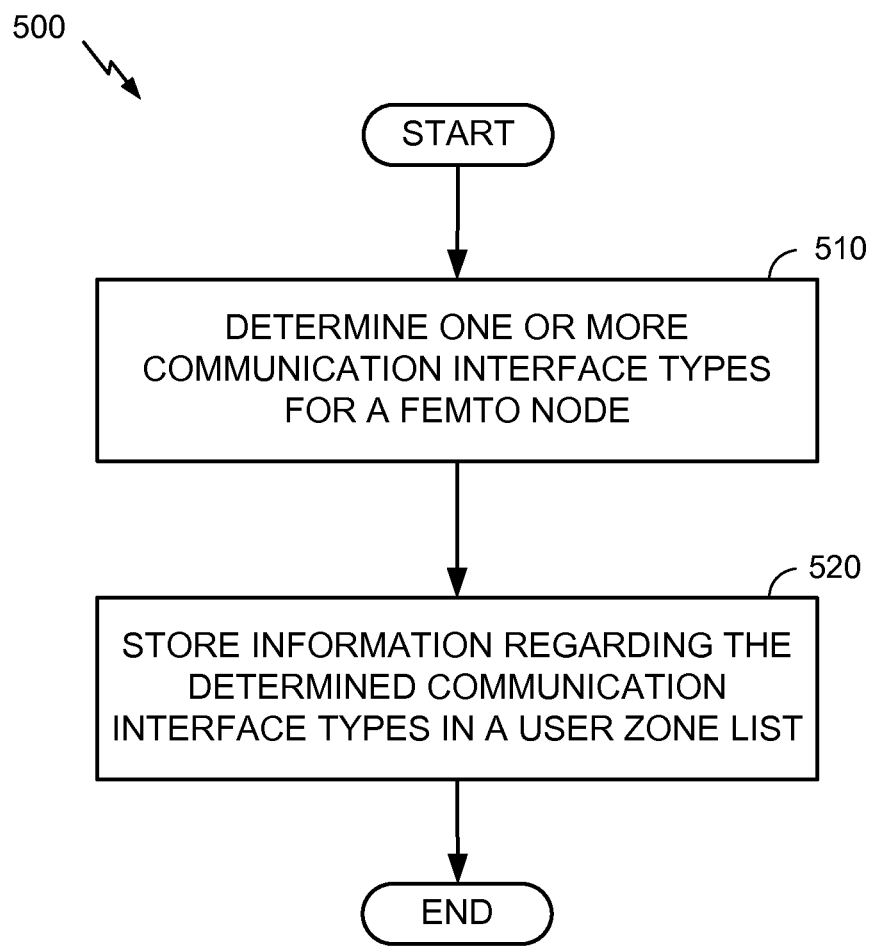
FIG. 5A is a flowchart illustrating a method of storing information in a user zone list.

There are a number of methods of storing information in a user zone list. The method 500 of FIG. 5A begins, in block 510, with the determination of one or more communication interface types for a femto node. The communication interface can be, for example, a cdma2000-1x interface, a HRPD (High Rate Data Packet) interface, an LTE (Long Term Evolution) interface, or one of the other interface types described above. In one embodiment, the femto node is capable of communicating using multiple communication interfaces. Thus, in one embodiment, the determination of one or more communication interface types includes the determination of multiple communication interface types, such as a cdma2000-1x interface and an LTE interface. The determination can be performed on the basis of one or more signals received from the femto node, such as a pilot signal or a beacon signal.

Next, in block 520, information regarding the determined communication interface types is stored in a user zone list. A user zone is one or more criteria associated with a particular femto node. When the criteria are satisfied, referred to as being "within the user zone," the UE can be triggered to search for the particular femto node. A user zone list is a data structure with information regarding one or more user zones. In one embodiment, the user zone list includes one or more user zone files and each file has information regarding a particular femto node and information regarding one or more user zones associated with the femto node. Each user zone file can store multiple user zones for a particular femto node. A particular embodiment of a user zone list is described below with respect to FIGS. 10-16.

A user zone can be, for example, a geographical area. In one embodiment, a user zone associated with a particular femto node is a geographical area near the particular femto node. More specifically, the criterion of the user zone is whether the UE is within the geographical area. In one embodiment, a user zone is a geographical area close enough to the particular femto node that a UE within the geographical area could detect the femto node. In one embodiment, a user zone is a geographical area close enough to the particular femto node that a UE within the geographical area searching for the femto node is likely to find the femto node. The geographical area can be stored as a set of latitudes and longitudes defining a polygon about the area, as a latitude-longitude pair and a radius defining a circle about the area, or by other means.

A user zone can be, for example, a radio frequency (RF) coverage. In one embodiment, a user zone associated with a particular femto node is coverage area of a network or access point. More specifically, the criterion of the user zone is whether the UE is within the coverage area of a particular network or access point. The UE can determine whether it is within the coverage area of a particular network or access point by receiving a signal from the network or access point having a specific identification. Thus, the coverage area can be stored as a network identification, a subnet identification, an access point identification, or a PN offset.

Figure 5B:
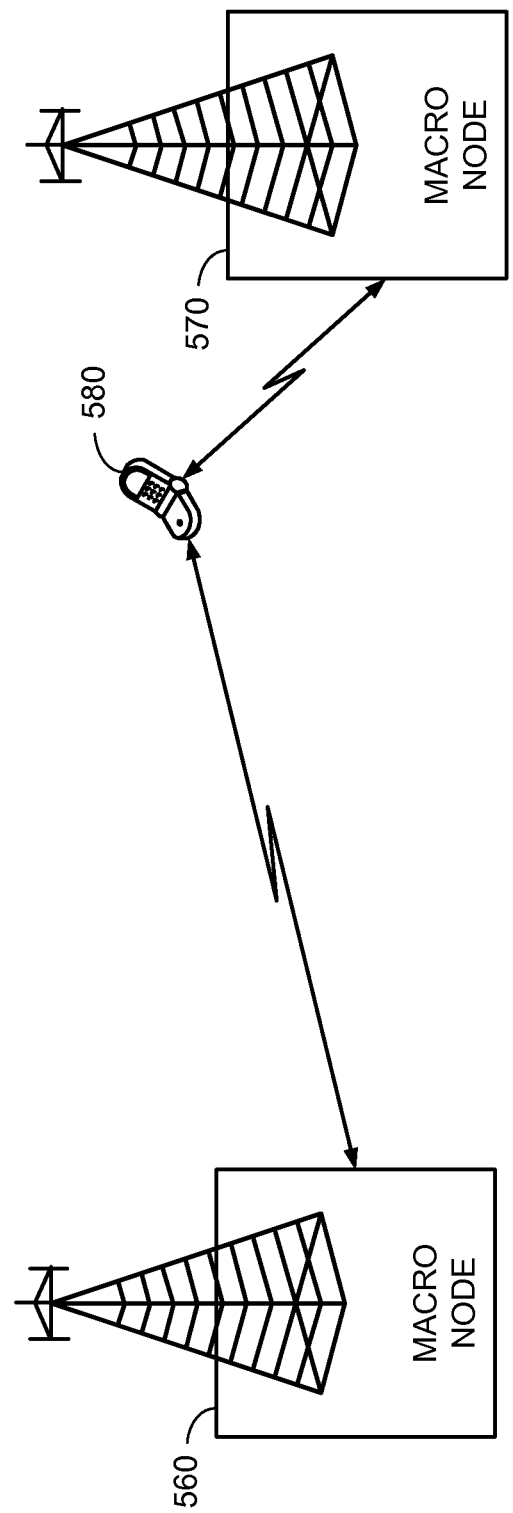
FIG. 5B is a functional block diagram of a UE within the coverage area of a first macro node and a second macro node.

A user zone can be, for example, a range of PN offset phase differences. FIG. 5B illustrates a UE 580 within the coverage area of a first macro node 560 and a second macro node 570. As described above with respect to FIG. 2, the UE 580 can periodically receive a first PN offset from the first macro node 560 and a second PN offset from the second macro node 570.

The first macro node 560 and second macro node 570 are synchronized. Thus, if the speed of light was infinite, the UE 580 would receive the first and second PN offsets at the same time. However, the speed of light is finite, and the UE 580 receives the first PN offset after a first propagation time and receives the second PN offset after a second propagation time. Unless the UE 580 is equidistance from the first macro node 560 and the second macro node 570, the two propagation times will be different. The UE 580 can determine the difference in these propagation times as a phase difference in the received PN offsets.

Because the propagation time is generally related to distance, a particular phase difference roughly corresponds to a conic section, and a range of phase differences roughly corresponds to an area. Thus, in one embodiment a user zone roughly corresponds to this area. In particular, the criteria are whether the UE 580 is within the coverage of a first macro node 560, the UE 580 is within the coverage of a second macro node 570, and the phase difference between the PN offsets received from the macro nodes is within a particular range. In another embodiment, other reference signals other than PN offsets are used to determine a user zone. Thus, in one embodiment, the user zone relates to a time difference between two received reference signals.

As mentioned above, information regarding the determined communication interface type is stored in a user zone list. In one embodiment, the information is stored as in indicator of a plurality of predetermined communication interface types. For example, in one embodiment, '00000000' is stored in the user zone list, or a user zone file of the list, if the determined communication type is cdma2000-1x and '00000001' is stored if the determined communication type is HRPD. In one embodiment, the predetermined communication interface types include cdma2000-1x, HRPD, GSM, UMTS, UMB, LTE, and WiMAX (or another WWAN [Wireless Wide Area Network] interface type).

Figure 6:
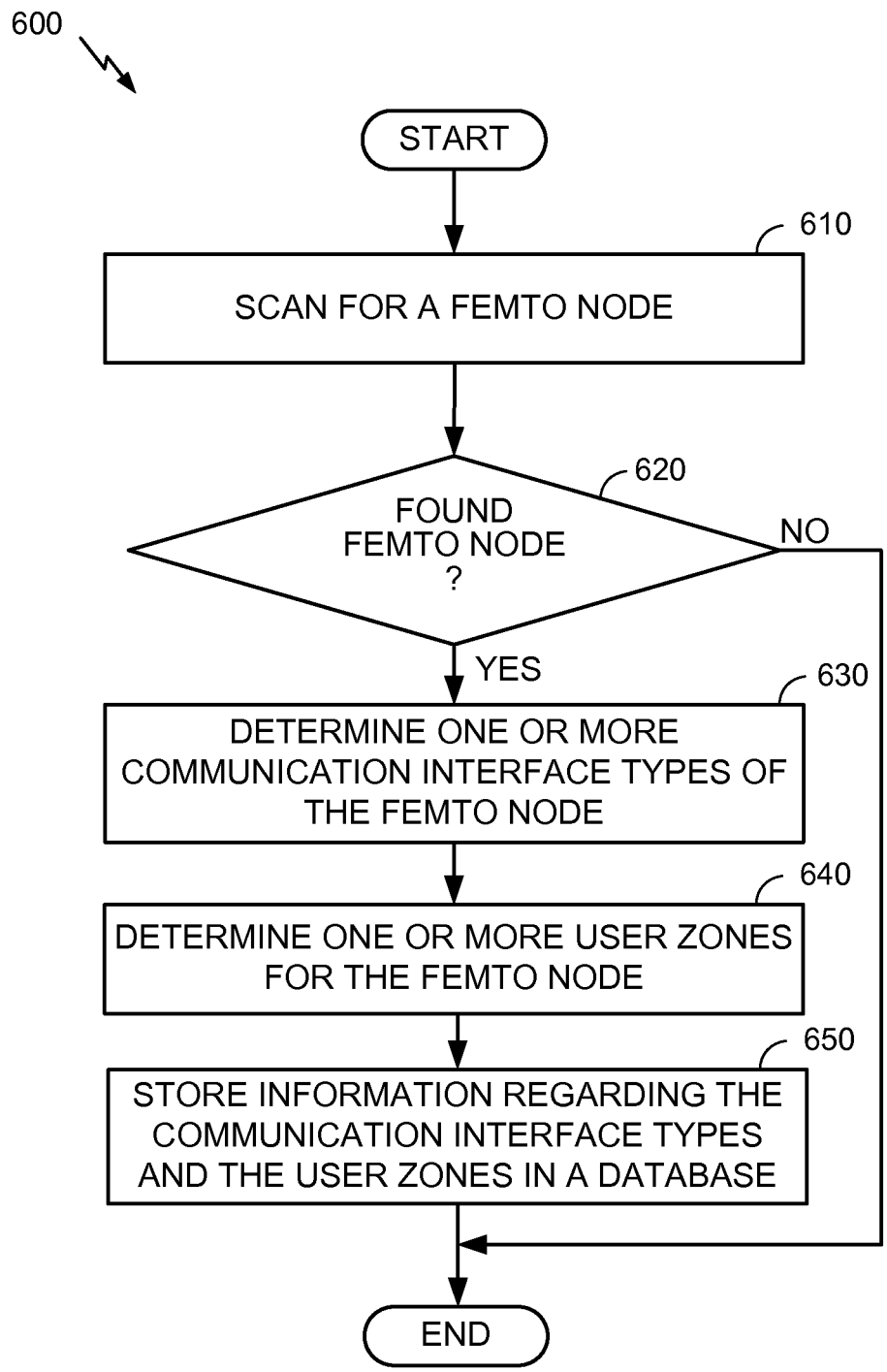
FIG. 6 is a flowchart illustrating a method of storing information regarding a femto node in a database.
Figure 9:
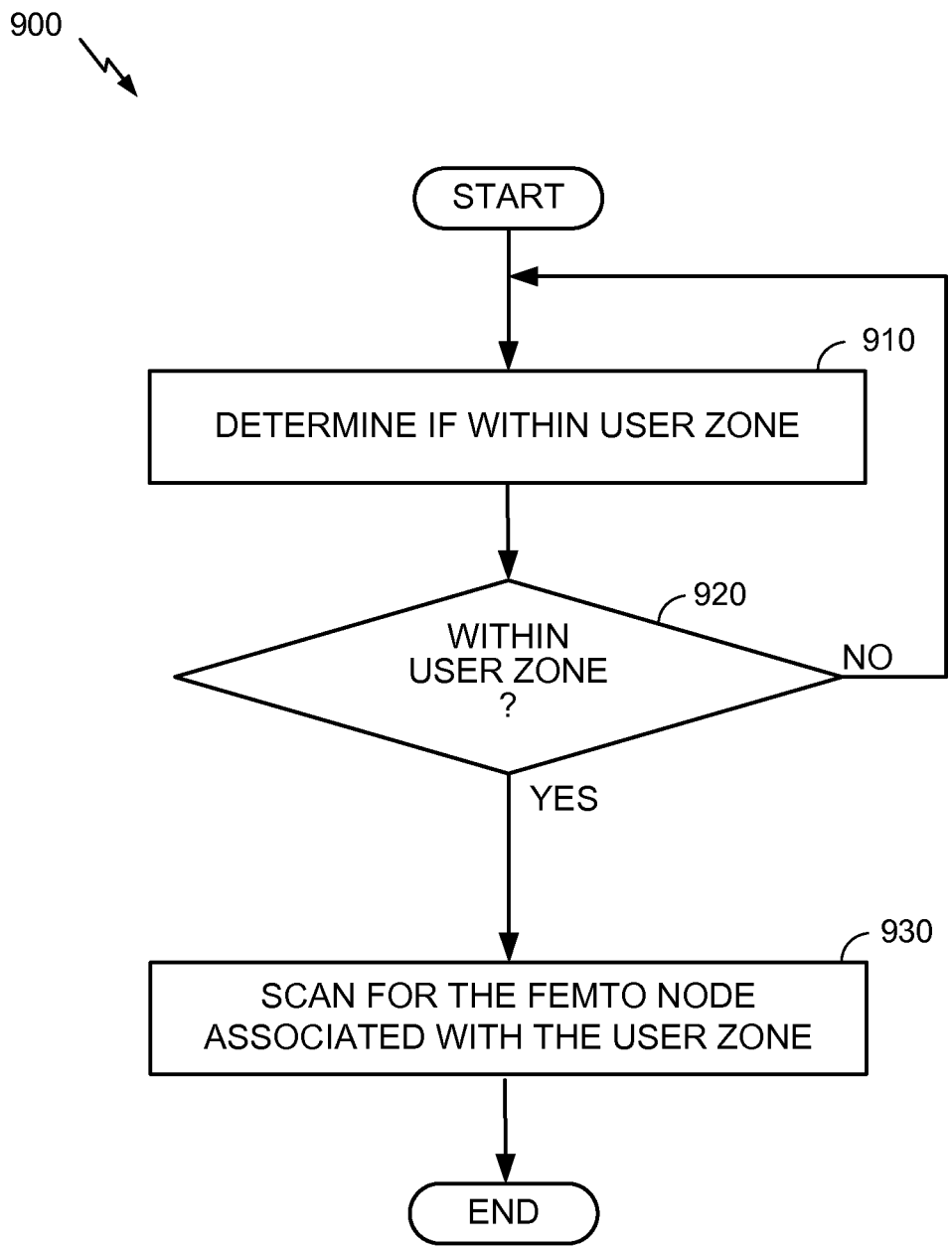
FIG. 9 is a flowchart of a method of scanning for femto node.

There are a number of methods of storing information regarding a femto node in a database. In one embodiment, the information is stored in a user zone list, whereas in other embodiments, other data structures are employed. The method 600 of FIG. 6 begins, at block 610, with a scan for a femto node. The scan can be performed by a UE in response to a trigger. The trigger can be a manual trigger or an automatic trigger. For example, a UE can be configured to periodically scan for a femto node. As another example, the UE can be configured to scan for a femto node when it is determined that the UE is within a user zone, as described below with respect to FIG. 9.

Next, in block 620, it is determined whether or not a femto node has been found. If a femto node has not been found, the process 600 ends. It is to be appreciated that each flowchart described herein is but a portion of the methods that a UE or other device can be configured to perform. Thus, although the process 600 ends if it is determined that a femto node is not found, this is not be construed as meaning that the UE ceases function, is stopped from performing other methods, or could not repeat the method.

If it is determined that a femto node has been found, the process 600 continues to block 630 where one or more communication interface types of the femto node are determined. It may be determined, in block 620, that a femto node is found if a signal is received from the femto node, such as a beacon signal or pilot signal. In one embodiment, one or more communication interface types are determined, in block 630, based on the signal or signals received from the femto node.

Continuing to block 640, one or more user zones are determined for the femto node. As described above, a user zone can be geographically based, RF coverage based, or based on other criteria. For example, other criteria can include a time. A femto node operated by a business, such as a coffee shop, may only be operational during business hours. As another example, other criteria can include a power status of the UE. If the UE has full or high battery status, it may be within a first user zone which is broader than a second user zone. If the UE has a low battery status, it may only be within the second user zone.

Each user zone can be determined based on the current conditions of the UE. For example, a geographical area user zone can be based on the current location of the UE. Similarly, a RF coverage user zone can be based on the RF coverage received by the UE.

Next, in block 650, the information regarding the communication interface types of the femto node and the user zones are stored in a database. In particular, the communication interface types of the femto node and the user zones of the femto node are stored in a data structure such that they are associated with one another. In one embodiment, the data structure is a user zone list having multiple user zone files. Each user zone file is a data structure containing information regarding a femto node, including a communication interface type of the femto node and one or more user zones associated with the femto node.

Figure 7:
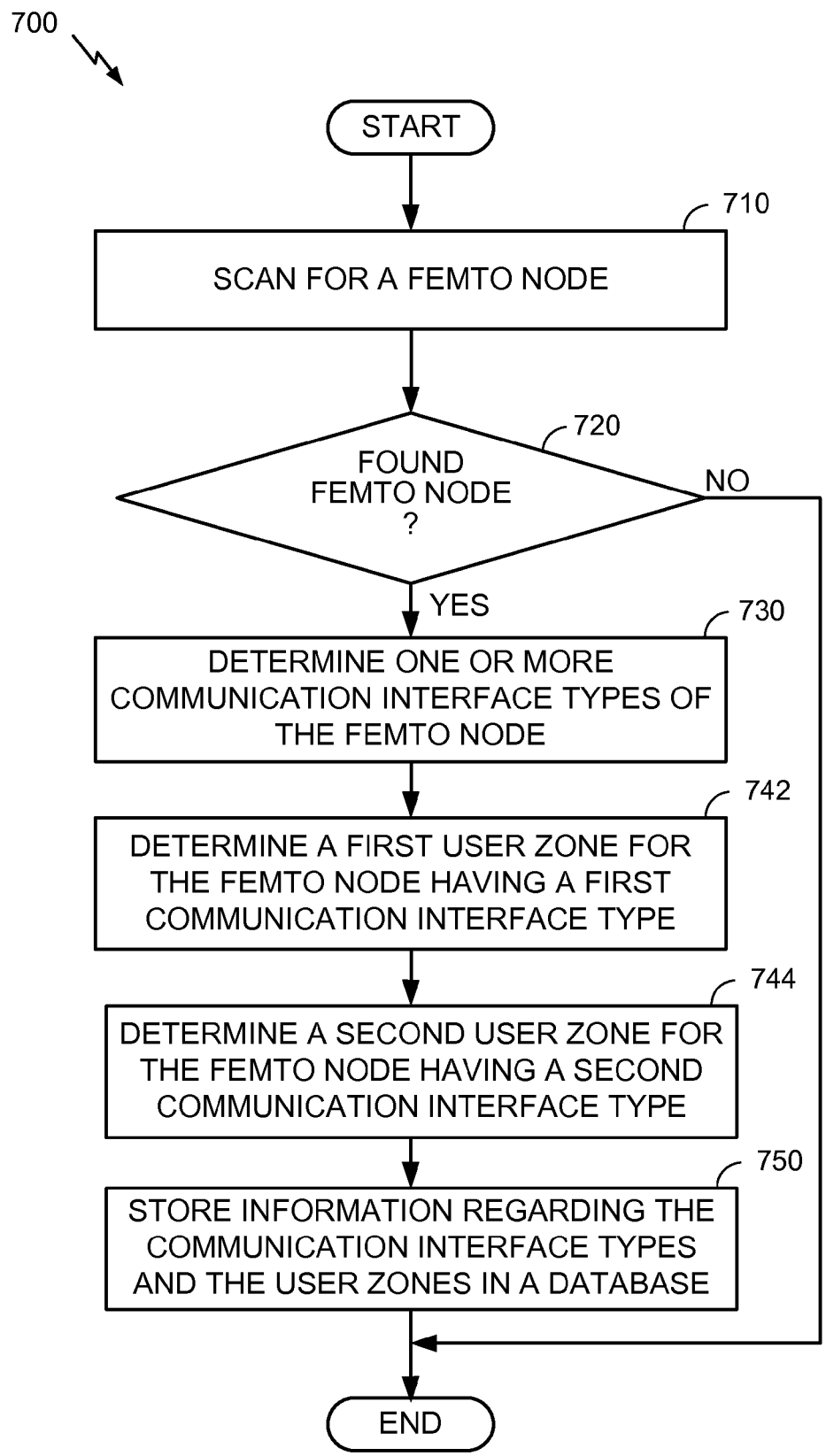
FIG. 7 is a flowchart illustrating a method of storing information regarding a femto node in a database including two user zones of different communication interface types.

The method 700 of FIG. 7 begins, at block 710, with a scan for a femto node. The scan can be performed by a UE in response to a trigger. The trigger can be a manual trigger or an automatic trigger. For example, a UE can be configured to periodically scan for a femto node. As another example, the UE can be configured to scan for a femto node when it is determined that the UE is within a user zone, as described below with respect to FIG. 9.

Next, in block 720, it is determined whether or not a femto node has been found. If a femto node has not been found, the process 700 ends. If it is determined that a femto node has been found, the process 700 continues to block 730 where one or more communication interface types of the femto node are determined. It may be determined, in block 720, that a femto node is found if a signal is received from the femto node, such as a beacon signal or pilot signal. In one embodiment, one or more communication interface types are determined, in block 730, based on the signal or signals received from the femto node.

Continuing to block 742, a first user zone is determined for the femto node. Next, in block 744, a second user zone is determined for the femto node. Although described sequentially, it is to be appreciated that actions described with respect to blocks 742 and 744 can be performed sequentially, in reverse order, concurrently, or simultaneously.

As described above, a user zone can be based on RF coverage. In one embodiment, a user zone based on RF coverage is associated with a communication interface type of the RF coverage. For example, in one embodiment, the first user zone is the coverage area of a cdma2000-1x access point. Accordingly, the communication interface type of the first user zone is cdma2000-1x. In another embodiment, the second user zone is the coverage area of a HRPD subnet. Accordingly the communication interface type of the second user zone is HRPD.

In one embodiment, the first user zone has a first communication interface type and the second user zone has a second user zone communication interface type which is different from the first communication interface type. Each communication interface type can be stored as in indication of one of a plurality of predetermined communication interface types.

Although not shown in FIG. 7, the method 700 can also include determining additional user zones, including user zones without communication interface types, such as user zones based on geography or time.

Continuing to block 750, the information regarding the communication interface types of the femto node and the user zones (and their communication types) are stored in a database. In particular, the communication interface types of the femto node and the user zones (and their communication types) of the femto node are stored in a data structure such that they are associated with one another. In one embodiment, the data structure is a user zone list having multiple user zone files. Each user zone file is a data structure containing information regarding a femto node, including a communication interface type of the femto node, and one or more user zones associated with the femto node. Both the first and second user zones communication interface types are stored associated with the first and second user zones, respectively.

Figure 8:
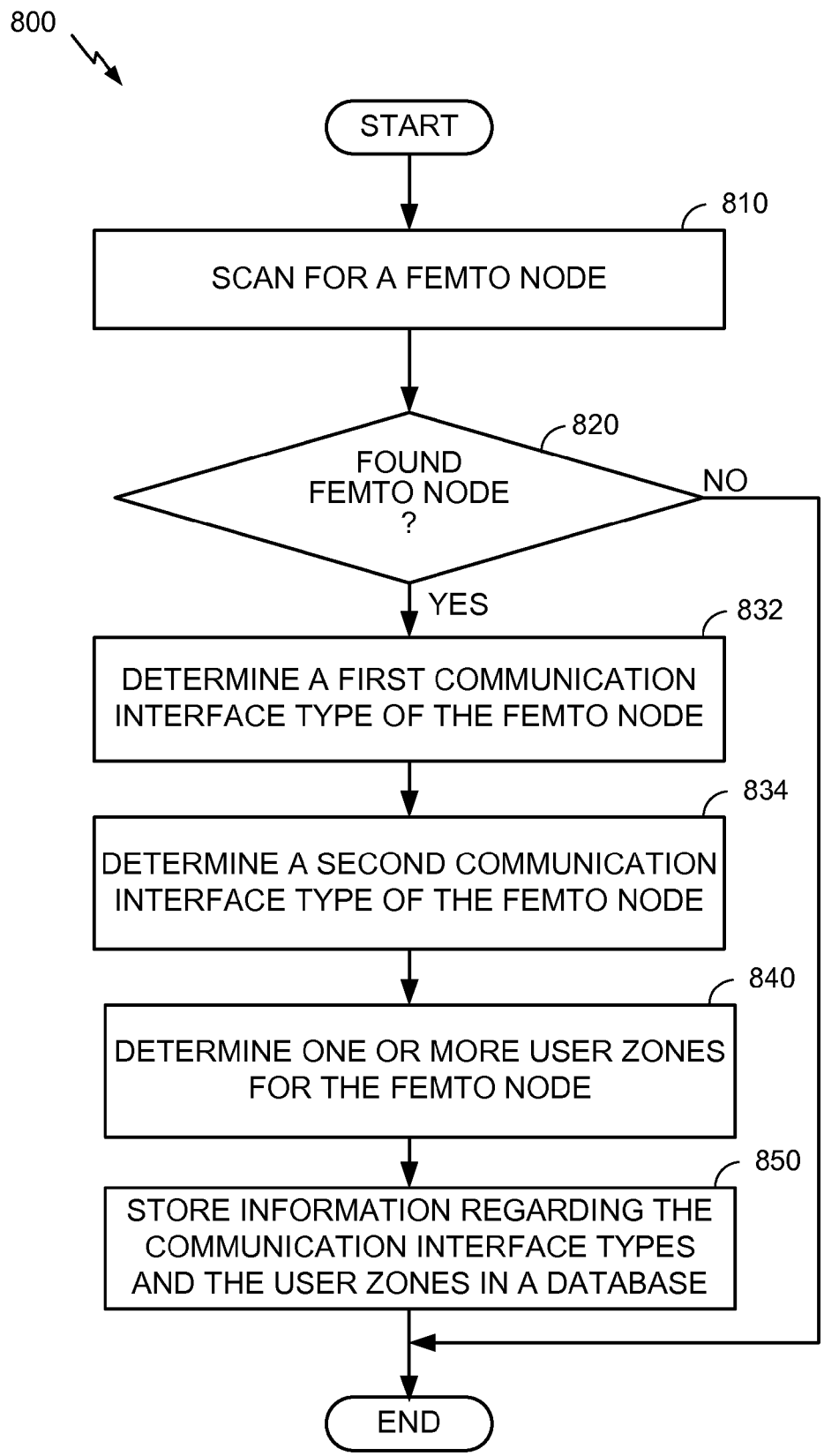
FIG. 8 is a flowchart illustrating a method of storing information regarding a femto node in a database including two different communication interface types of the femto node.

The method 800 of FIG. 8 begins, at block 800, with a scan for a femto node. The scan can be performed by a UE in response to a trigger. The trigger can be a manual trigger or an automatic trigger. For example, a UE can be configured to periodically scan for a femto node. As another example, the UE can be configured to scan for a femto node when it is determined that the UE is within a user zone, as described below with respect to FIG. 9.

Next, in block 820, it is determined whether or not a femto node has been found. If a femto node has not been found, the process 800 ends. If it is determined that a femto node has been found, the process 800 continues to block 832 where a first communication interface type of the femto node is determined and to block 834 where a second communication interface types of the femto node is determined Although described sequentially, it is to be appreciated that actions described with respect to blocks 832 and 834 can be performed sequentially, in reverse order, concurrently, or simultaneously.

It may be determined, in block 820, that a femto node is found if a signal is received from the femto node, such as a beacon signal or pilot signal. In one embodiment, the first and second communication interface types are determined, in blocks 832 and 834, based on the signal or signals received from the femto node. The signals can indicate, for example, that the femto node is configured to communicate using a first communication interface and a second communication interface. For example, the femto node can be configured to communicate using a 3 G communication interface and a WiFi communication interface. As another example, the femto node can be configured to communicate using a cdma2000-1x communication interface and a HRPD communication interface.

Continuing to block 840, one or more user zones are determined for the femto node. As described above, a user zone can be geographically based, RF coverage based, or based on other criteria. Each user zone can be determined based on the current conditions of the UE. For example, a geographical area user zone can be based on the current location of the UE. Similarly, a RF coverage user zone can be based on the RF coverage received by the UE.

Continuing to block 850, the information regarding the communication interface types of the femto node and the user zones are stored in a database. In particular, the communication interface types of the femto node and the user zones of the femto node are stored in a data structure such that they are associated with one another.

In one embodiment, the data structure is a user zone list having multiple user zone files. Each user zone file is a data structure containing information regarding a femto node, including a communication interface type of the femto node and one or more user zones associated with the femto node. In one embodiment, when two communication interface types are determined for the femto node, two separate user zone files are stored. Thus, in one embodiment, a first user zone file is stored containing information regarding the femto node, including the first communication interface type and the user zones and a second user zone file is stored containing the information regarding the femto node, including the second communication interface type and the user zones. This has to potential to redundantly save data, which can be a significant memory hit.

In one embodiment, a first user zone file is stored containing information regarding the femto node, including the first communication interface type and the user zones and a second user zone file is stored containing a reference to the information regarding the femto node in the first user zone file, the second communication interface type, and a reference to the user zones in the first user zone file.

A user zone list or other data structure can be used to facilitate the location of, and subsequent communication with, a particular femto node. The method 900 of FIG. 9 begins, in block 910, with determination of whether a device is within a user zone. As mentioned above, although the phrase "within a user zone" is used herein, it is to be appreciated that the zone may not be geographic an may not refer to a particular location, but rather that the user zone is a set of one or more criteria and the phrase "within the user zone" means that the criteria are satisfied. The criteria can be based on geography or other criteria. A user zone may be defined by multiple criteria, one or more based on geography and one or more based on other factors.

In one embodiment, it is determined that a device is within the user zone if the device is within a particular geographical area. In one embodiment, it is determined that a device is within the user zone if the device is receiving a signal from a particular network, subnet, base station, or access point. In one embodiment, it is determined that a device is within the user zone if a PN offset phase difference is within a particular range.

Next, in block 920, if it is determined that the device is not within the user zone, the method 900 returns to block 910. Otherwise, the method 900 continues to block 930 where a scan is performed, searching for the femto node associated with the user zone. The search can be simplified by additional information about the femto node associated with the user zone in a user zone file stored in a user zone list.

Figure 10:
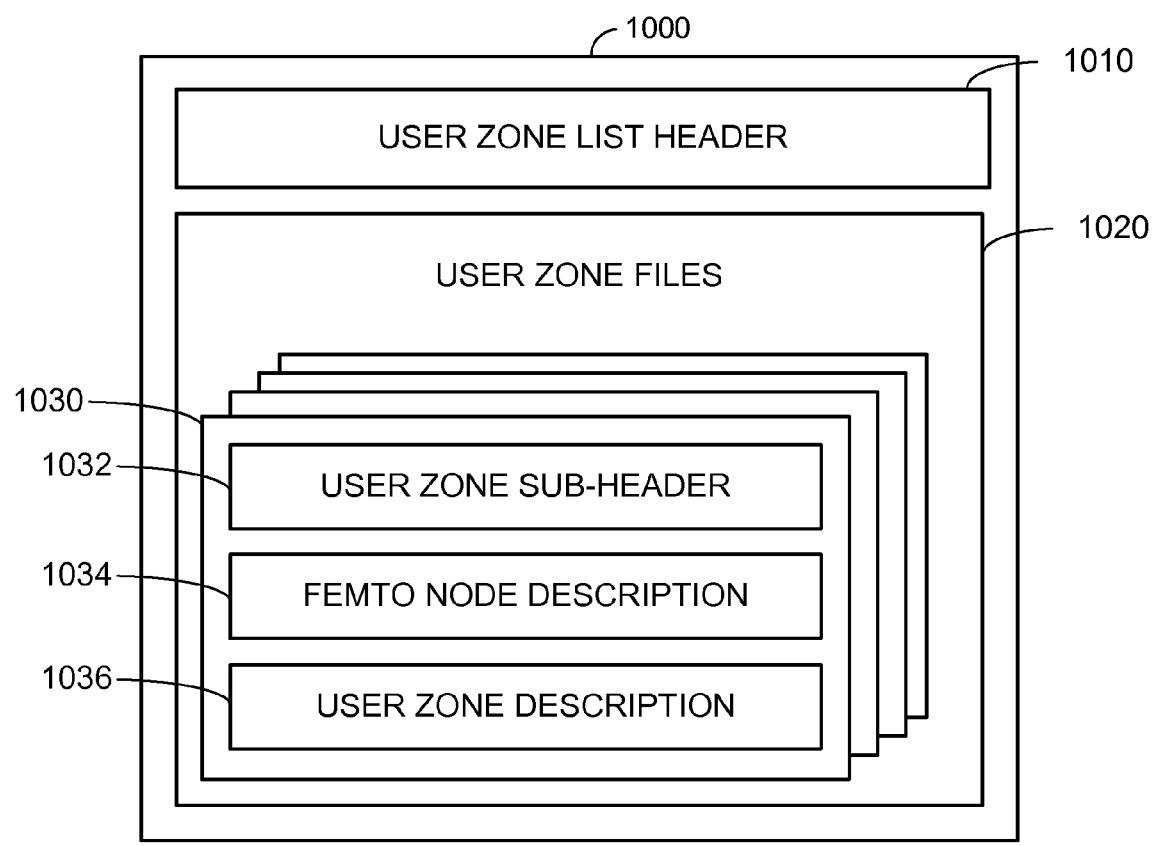
FIG. 10 is a diagram of an exemplary user zone list.

An exemplary user zone list 1000 is described with respect to FIG. 10. The user zone list 1000 can be stored in a memory or other computer-readable medium. The user zone list 1000 contains a user zone list header 1010 and one or more user zone files 1020. The user zone list header contains information about the user zone list or other information common to all the user zone files 1020. Each user zone file 1030 contains a user zone sub-header 1032, a femto node description 1034, and a user zone description 1036 as described more fully below.

Figure 11:
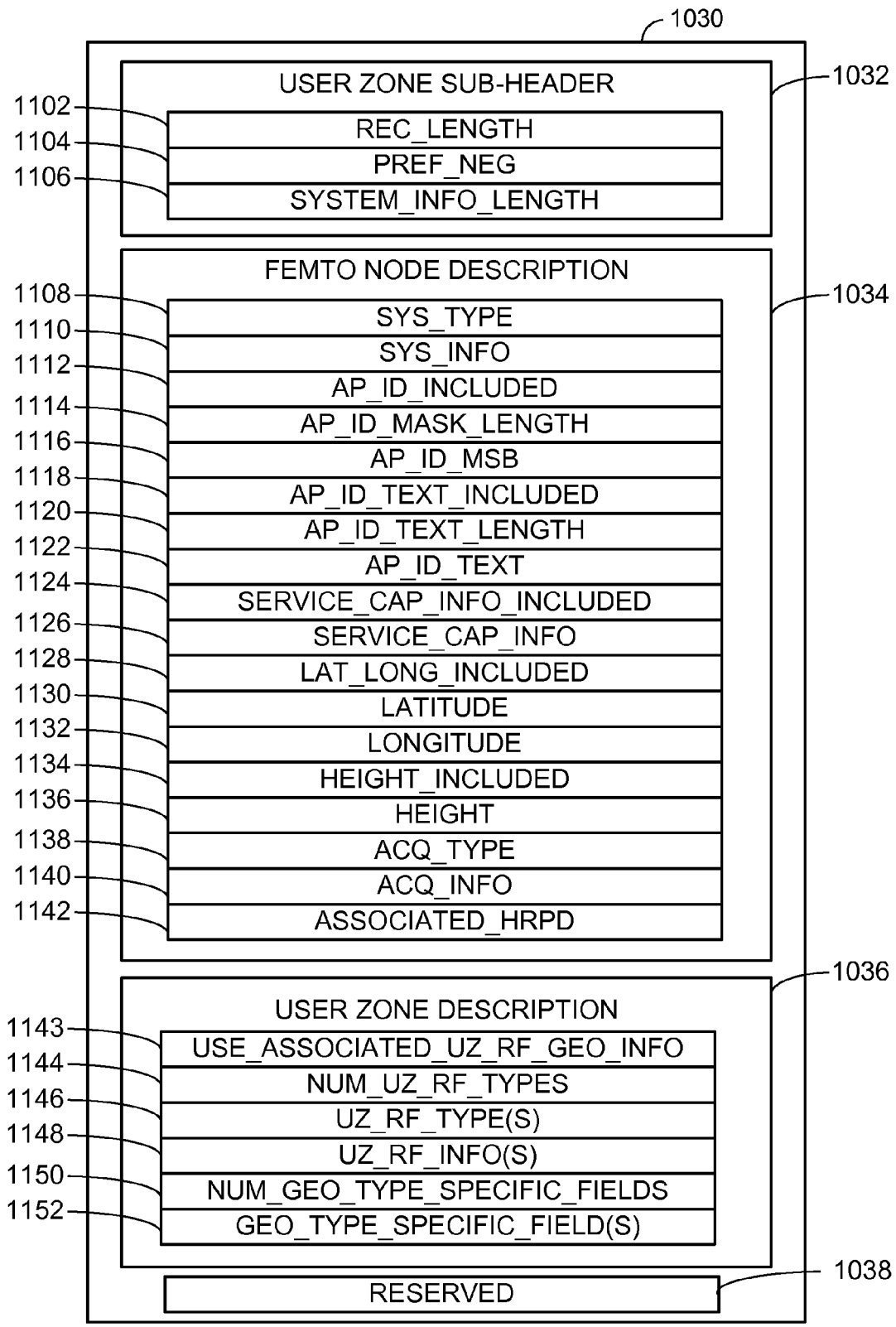
FIG. 11 is a diagram of an exemplary user zone file.

An exemplary user zone file 1030 is described with respect to FIG. 11. The user zone file 1030 can be stored in a memory or other computer-readable medium. The user zone file 1030 can be stored along with other user zone files in a user zone list. As mentioned above, the user zone file 1030 includes a user zone sub-header 1032. In one embodiment, the user zone sub-header 1032 includes a REC_LENGTH field 1102, a PREF_NEG field 1104, and a SYSTEM_INFO_LENGTH field 1106.

The REC_LENGTH field 1102 stores information regarding the total length of the user zone file 1030. In one embodiment, the REC_LENGTH field 1102 is set to the total length of the record in octets, including the REC_LENGTH field 1102. In one embodiment, the REC_LENGTH field is 16 bits.

The PREF_NEG field 1104 stores information regarding whether or not a particular mobile device is allowed to operate on the femto node associated with the user zone file 1030. In one embodiment, the PREF_NEG field 1104 is a single bit. In one embodiment, the PREF_NEG field 1104 is set to '1' if the UE is allowed to operate on the femto node, and a '0' if the UE is not allowed to operate on the femto node. In one embodiment, creation and configuration of user zone files 1030 with the PREF_NEG field 1104 set to '0' is under control of a system operator and is subject to system operator policy.

The SYSTEM_INFO_LENGTH field 1106 stores information regarding the length of the femto node description 1034. In one embodiment, the SYSTEM_INFO_LENGTH field 1106 stores the length, in octets, of the fields, starting with and including the SYSTEM_INFO_LENGTH field 1106, and including the fields described below as within the femto node description 1034. In one embodiment, the SYSTEM_INFO_LENGTH field 1106 is eight bits.

As mentioned above, the user zone file 1030 includes a femto node description 1034. In one embodiment, the femto node description 1034 includes a SYS_TYPE field 1108, a SYS_INFO field 1110, an AP_ID_INCLUDED field 1112, an AP_ID_MASK_LENGTH field 1114, an AP_ID_MSB field 1116, an AP_ID_TEXT_INCLUDED field 1118, an AP_ID_TEXT_LENGTH field 1120, an AP_ID_TEXT field 1122, a SERVICE_CAP_INFO_INCLUDED field 1124, a SERVICE_CAP_INFO field 1126, a LAT_LONG_INCLUDED field 1128, a LATITUDE field 1130, a LONGITUDE field 1132, a HEIGHT_INCLUDED field 1134, a HEIGHT field 1136, an ACQ_TYPE field 1138, an ACQ_INFO field 1140, and an ASSOCIATED_HRPD field 1142.

The SYS_TYPE field 1108 stores information regarding the communication interface type of the femto node. In one embodiment, the SYS_TYPE field 1108 is 8 bits. In one embodiment, the SYS_TYPE field 1108 is set to '00000000' if the communication interface type is cdma2000-1x and the SYS_TYPE field 1108 is set to '00000001' if the communication interface type is HRPD.

The SYS_INFO field 1110 is structured differently depending on the value of the SYS_TYPE field 1108. Exemplary structures are described below with respect to FIGS. 12 and 13.

The AP_ID_INCLUDED field 1112 stores information regarding whether or not the user zone file 1030 includes information, such as that described below, regarding an access point is included. In one embodiment, the AP_ID_INCLUDED field 1112 is a single bit. In one embodiment, the AP_ID_INCLUDED field 1112 is set to '1' if the information is included and is set to '0' if the information is not included.

The AP_ID_MASK_LENGTH field 1114 stores information regarding the number of bits which can identify a group of access points or a single access point. In one embodiment, the AP_ID_MASK_LENGTH field 1114 specifies the number of consecutive bits (starting from the most significant bits) of an access point identification (AP_ID). In one embodiment the AP_ID_MASK_LENGTH is transmitted in an overhead signaling message. In one embodiment the AP_ID_MASK_LENGTH field 1114 is eight bits. However, if the AP_ID_INCLUDED field 1112 is set to '0', the AP_ID_MASK_LENGTH field 1114 is excluded, i.e., zero bits.

The AP_ID_MSB field 1116 stores information regarding the most significant bits of an access point identification. The AP_ID_MSB field 1116 is as many bits as specified in the AP_ID_MASK_LENGTH field 1114 and the information in the AP_ID_MSB field 1116 is sufficient to identify a group of access points or a single access point. It is to be appreciated that in the case that the AP_ID_MASK_LENGTH field 1114 is set to the length of the AP_ID, the AP_ID_MSB field 1116 is equal to the AP_ID.

The AP_ID_TEXT_INCLUDED field 1118 stores information regarding whether or not the user zone file 1030 included information, such as that described below, regarding an access point other than the identification itself. In one embodiment, the AP_ID_TEXT_INCLUDED field 1118 is a single bit. In one embodiment, the AP_ID_TEXT_INCLUDED field 1118 is set to '1' if the information is included and is set to '0' if the information is not included.

The AP_ID_TEXT_LENGTH field 1120 stores information regarding the length of the AP_ID_TEXT field 1122, if it is included. In one embodiment, the AP_ID_TEXT_LENGTH 1120 field is set to the number of octets in the AP_ID_TEXT field 1122. If the AP_ID_TEXT_INCLUDED field 1118 indicates that access point text information is excluded, the AP_ID_TEXT_LENGTH field 1120 (and the AP_ID_TEXT field 1122) are excluded.

The AP_ID_TEXT field 1122 generally provides information about an access point. The AP_ID_TEXT field 1122 can include a number of subfields. In one embodiment, the AP_ID_TEXT field 1122 includes a MSG_ENCODING sub-field, a NUM_FIELDS subfield, one or more CHARi subfields, and a RESERVED subfield. In one embodiment, the MSG_ENCODING sub-field stores information regarding message encoding. It is to be appreciated that support of an encoding method does not necessarily imply that the entire encodable character set needs to be supported. In general, once the supported character set is determined, various subsets of the character set can be supported. If a message is composed entirely of characters from a supported subset of a character set, it can be displayed. If a message contains one or more unsupported characters of a characters set, they can be discarded. In one embodiment, the NUM_FIELDS subfield stores information regarding the number of CHARi subfields. In one embodiment, if the MSG_ENCODING subfield is set to '00101', indicating Shift-JIS, or '00110', indicating Korean, the NUM_FIELDS subfield is set to the total length in octets of the CHARi subfields. In one embodiment, each CHARi subfield stores information regarding one or more characters. Thus, the CHARi subfields can create a character string which identifies a base station. In one embodiment, RESERVED bits are added such that number of bits of the AP_ID_TEXT field 1122 is an integer number of octets. In one embodiment, all RESERVED bits are set to '0'.

The SERVICE_CAP_INFO_INCLUDED field 1124 stores information regarding whether service capability information is included in the user zone file 1030. In one embodiment, the SERVICE_CAP_INFO_INCLUDED field 1124 is a single bit. In one embodiment, the SERVICE_CAP_INFO_INCLUDED field 1124 is set to '1' if the information is included, and is set to '0' is the information is not included.

The SERVICE_CAP_INFO field 1126 stores information regarding the service capability of the femto node and the UE. In one embodiment, the SERVICE_CAP_INFO field 1126 is 32 bits. In one embodiment, if the SERVICE_CAP_INFO_INCLUDED field 1124 is set to '0', the SERVICE_CAP_INFO field 1126 is excluded, i.e., zero bits.

The LAT_LONG_INCLUDED field 1128 stores information regarding whether latitude and longitude are included in the user zone file 1030. In one embodiment, the LAT_LONG_INCLUDED field 1128 is a single bit. In one embodiment, the LAT_LONG_INCLUDED field 1128 is set to '1' if the information is included, and is set to '0' if the information is not included.

The LATITUDE field 1130 stores information regarding a latitude. In one embodiment, the LATITUDE field 1130 stores information regarding the latitude of the femto node. In one embodiment, the LATITUDE field 1130 is 23 bits, expressing latitude in units of 0.25 seconds as a two's complemented signed number with positive numbers signifying North latitudes and negative numbers signifying South latitudes. In one embodiment, values between −1296000 and 1296000 inclusive correspond to a range of −90° and +90° and are valid.

The LONGITUDE field 1132 stores information regarding a longitude. In one embodiment, the LONGITUDE field 1132 stores information regarding the longitude of the femto node. In one embodiment, the LONGITUDE field 1132 is 24 bits, expressing longitude in units of 0.25 seconds as a two's complemented signed number with positive numbers signifying East longitudes and negative numbers signifying West longitudes. In one embodiment, values between −2592000 and 2592000 inclusive correspond to a range of −180° to +180° and are valid.

The HEIGHT_INCLUDED field 1134 stores information regarding whether a height is included in the user zone file 1030. In one embodiment, the HEIGHT_INCLUDED field 1134 is a single bit. In one embodiment, the HEIGHT_INCLUDED field 1134 is set to '1' if the information is included and is set to '0' if the information is not included.

The HEIGHT field 1136 stores information regarding a height. In one embodiment, the HEIGHT field 1136 stores information regarding the height of a femto node. In one embodiment, the HEIGHT field 1136 is sixteen bits expressing a two's complement signed value set to the height above the WGS-84 reference ellipsoid, in units of one meter, in the range from −500 m to 15883 m.

The ACQ_TYPE field 1138 stores information regarding an acquisition type. In one embodiment, the ACQ_TYPE field 1138 is eight bits. In one embodiment, the ACQ_TYPE field is set to '00000000' if the acquisition type is cd2000-1x or HRPD.

The ACQ_INFO field 1140 is structured differently depending on the value of the ACQ_TYPE field 1138. An exemplary structure is described below with respect to FIG. 14.

The ASSOCIATED_HRPD field 1142 stores information regarding an associated user zone file. As described above with respect to FIG. 8, a femto node can have multiple communication interface types and have information regarding each communication interface type stored in multiple files. In one embodiment, when the SYS_TYPE field 1108 is set to cdma2000-1x ('00000000') and there is an associated HRPD system available, the ASSOCIATED_HRPD field 1142 is set to the 31 bit field comprising the UZ_ID and UZ_SID identifying the user zone file of the associated HRPD system. In one embodiment, when the SYS_TYPE field 1108 is set to HRPD ('00000001'), the ASSOCIATED_HRPD field 1142 is not included.

As mentioned above, the user zone file 1030 includes a user zone description 1036. In one embodiment, the user zone description 1036 includes a USE_ASSOCIATED_UZ_RF_GEO_INFO field 1143, a NUM_UZ_RF_TYPES field 1144, one or more UZ_RF_TYPE fields 1146, one or more UZ_RF_INFO fields 1148, a NUM_GEO_TYPE_SPECIFIC_FIELDS field 1150 and one or more GEO_TYPE_SPECIFIC_FIELD fields 1152.

The USE_ASSOCIATED_UZ_RF_GEO_INFO field 1143 stores information regarding whether user zone information from an associated user zone file should be used. In one embodiment, the USE_ASSOCIATED_UZ_RF_GEO_INFO field 1143 is a single bit.

In one embodiment, the ASSOCIATED_HRPD field 1142 of a first user zone file with a SYS_TYPE field 1108 indicating cdma2000-1x refers to a second user zone file with a SYS_TYPE field 1108 indicating HRPD. Within the second user zone file, if the USE_ASSOCIATED_UZ_RF_GEO_INFO field 1143 is set to '1', information from the first user zone file will be used. In particular, the UZ_RF_TYPE field 1146 and GEO_TYPE_SPECIFIC_FIELD field 1152 information (described below) from the first user zone file will be used as though it were in the second user zone file. Within the second user zone file, if the USE_ASSOCIATED_UZ_RF_GEO_INFO field 1143 is set to '0', information from the first user zone file will not be used. One or more UZ_RF_TYPE fields 1146 and GEO_TYPE_SPECIFIC_FIELD fields 1152 may be provisional. In one embodiment, for a user zone file with the SYS_TYPE filed 1108 set to cdma2000-1x, the USE_ASSOCIATED_UZ_RF_GEO_INFO is set to '0'.

The NUM_UZ_RF_TYPES field 1144 stores information regarding the number of RF coverage based user zones stored within the file. In one embodiment, the NUM_UZ_RF_TYPES field 1144 is four bits.

The user zone file 1030 can have one or more UZ_RF_TYPE fields 1146. In one embodiment, the user zone file 1030 has the number of UZ_RF_TYPE fields 1146 specified in the NUM_UZ_RF_TYPES field 1144. Each UZ_RF_TYPE field 1146 stores information regarding the communication interface type of the coverage for which a user zone is defined. In one embodiment, each UZ_RF_TYPE field 1146 is eight bits. In one embodiment, the UZ_RF_TYPE field 1146 is set to '00000000' if the communication interface type is cdma2000-1x and the UZ_RF_TYPE field 1146 is set to '00000001' if the communication interface type is HRPD. It is to be appreciated that at least one or the one or more UZ_RF_TYPE fields 1146 can be different from the SYS_TYPE field 1108.

Each UZ_RF_TYPE field 146 is associated with a UZ_RF_INFO field 1148. The UZ_RF_INFO field 1148 is structured differently depending on the value of the UZ_RF_TYPE field 1108. Generally, the UZ_RF_INFO field 1108 describes a user zone based on an RF coverage. Exemplary structures are described below with respect to FIGS. 15 and 16.

In another embodiment, the UZ_RF_TYPE field 1146 is used to indicate a type of user zone which is neither RF coverage based nor geography based. For example, the UZ_RF_TYPE field 1146 may indicate that the information in the UZ_RF_INFO field 1148 specifies a time or a battery status.

The NUM_GEO_TYPE_SPECIFIC_FIELDS field 1150 stores information regarding the number of geography based user zones stored within the file. In one embodiment, the NUM_GEO_TYPE_SPECIFIC_FIELDS field 1150 is four bits.

The user zone file 1030 can have one or more GEO_TYPE_SPECIFIC_FIELD fields 1152. In one embodiment, the user zone file 1030 has the number of GEO_TYPE_SPECIFIC_FIELD fields 1152 specified in the NUM_GEO_TYPE_SPECIFIC_FIELDS field 1150. Each GEO_TYPE_SPECIFIC_FIELD field 1152 stores information regarding a location defining a user zone.

In one embodiment, the user zone file 1030 also includes RESERVED bits such that the length of the user zone file 1030 is an integer number of octets. In one embodiment, the RESERVED bits are all set to '0'.

Figure 12:
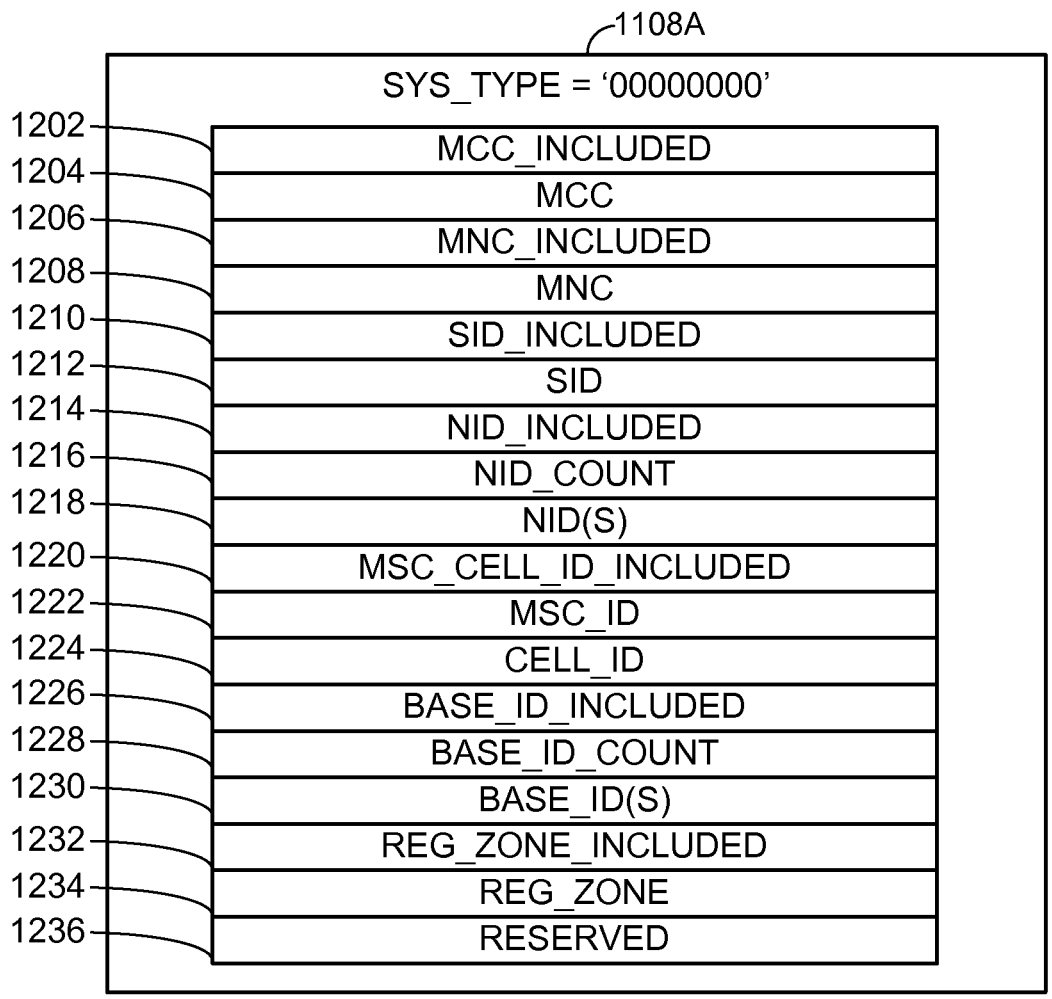
FIG. 12 is a diagram of an exemplary SYS_INFO field for which the SYS_TYPE field is set to cdma2000-1x.
Figure 13:
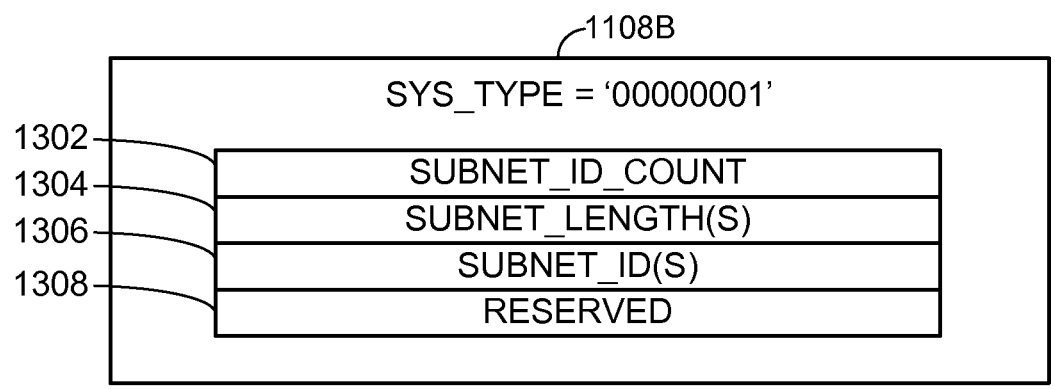
FIG. 13 is a diagram of an exemplary SYS_INFO field for which the SYS_TYPE field is set to HRPD.

One embodiment of an exemplary SYS_INFO field 1108A for which the SYS_TYPE field 1106 is set to cdma2000-1x is described with respect to FIG. 12. The SYS_INFO field 1108A can be stored in a memory or other computer-readable medium. The SYS_INFO field 1108A can be stored along with other fields in a user zone file in a user zone list. In one embodiment, the SYS_INFO field 1108A includes a number of different fields as described further below. As mentioned above, the SYS_INFO field 1108A can be structured differently depending on the value stored in the SYS_TYPE field 1106.

The MCC_INCLUDED field 1202 stores information regarding whether a mobile country code (MCC) is included in the SYS_INFO field 1108A. In one embodiment, the MCC_INCLUDED field 1202 is a single bit. In one embodiment, the MCC_INCLUDED field 1202 is set to '1' if the information is included and is set to '0' if the information is not included.

The MCC field 1204 stores information regarding a mobile country code. In one embodiment, when the SYS_TYPE field 1106 is set to cdma2000-1x, the MCC field 1204 is a twelve bit field which stores a three digit mobile country code using BCD (binary-coded decimal) encoding. In one embodiment, when the MCC_INCLUDED field 1202 is set to '0', the MCC field 1204 is excluded, i.e., zero bits.

The MNC_INCLUDED field 1206 stores information regarding whether a mobile network code (MNC) is included in the SYS_INFO field 1108A. In one embodiment, the MNC_INCLUDED field 1206 is a single bit. In one embodiment, the MNC_INCLUDED field 1202 is set to '1' if the information is included and is set to '0' if the information is not included.

The MNC field 1208 stores information regarding a mobile network code. In one embodiment, when the SYS_TYPE field 1106 is set to cdma2000-1x, the MNC field 1208 is a twelve bit field which stores a two or three digit mobile network code using BCD (binary-coded decimal) encoding. In one embodiment, when the MCC_INCLUDED field 1202 is set to '0', the MCC field 1204 is excluded, i.e., zero bits. In one embodiment, if the mobile network code is two digits, the least significant digit is encoded if 'F'. For example, if the mobile network code is 23, the MNC field 1208 is set to '23F'.

The SID_INCLUDED field 1210 stores information regarding whether a system identification (SID) is included in the SYS_INFO field 1108A. In one embodiment, the SID_INCLUDED field 1210 is a single bit. In one embodiment, the SID_INCLUDED field 1210 is set to '1' if the information is included and is set to '0' if the information is not included.

The SID field 1212 stores information regarding a system identification. In one embodiment, the SID field 1212 stores a 15 bit system identifier. In one embodiment, when the SID_INCLUDED field 1202 is set to '0', the MCC field 1204 is excluded, i.e., zero bits.

The NID_INCLUDED field 1214 stores information regarding whether one or more network identifications (NID) are included in the SYS_INFO field 1108A. In one embodiment, the NID_INCLUDED field 1214 is a single bit. In one embodiment, the NID_INCLUDED field 1214 is set to '1' if the information is included and is set to '0' if the information is not included.

The NID_COUNT field 1216 stores information regarding the number of network identifiers stored within the SYS_INFO field 1108A. In one embodiment, the NID_COUNT field 1216 is six bits. In one embodiment, when the NID_INCLUDED field 1214 is set to '0', the NID_COUNT field 1216 is excluded, i.e., zero bits.

The SYS_INFO field 1108A can have one or more NID fields 1218. In one embodiment, the SYS_INFO field 1108A has the number of NID fields 1218 specified in the NID_COUNT field 1216. Each NID field 1218 stores information regarding a network identifier. In one embodiment, each NID field 1218 is sixteen bits. In one embodiment, when the NID_INCLUDED field 1214 is set to '0', there are no NID fields 1218.

The MSC_CELL_ID_INCLUDED field 1220 stores information regarding whether a mobile switching center (MSC) identification and a cell identification is included in the SYS_INFO field 1108A. In one embodiment, the MSC_CELL_ID_INCLUDED field 1220 is a single bit. In one embodiment, the MSC_CELL_ID_INCLUDED field 1220 is set to '1' if the information is included and is set to '0' if the information is not included.

The MSC_ID field 1222 stores information regarding a mobile switching center identification. In one embodiment, the MSC_ID field 1222 stores a 24 bit system identifier. In one embodiment, when the MSC_CELL_ID_INCLUDED field 1220 is set to '0', the MSC_ID field 1204 is excluded, i.e., zero bits.

The CELL_ID field 1224 stores information regarding a cell (or sector) identification. In one embodiment, the CELL_ID field 1224 stores a 16 bit system identifier. In one embodiment, when the MSC_CELL_ID_INCLUDED field 1220 is set to '0', the CELL_ID field 1204 is excluded, i.e., zero bits.

The BASE_ID_INCLUDED field 1226 stores information regarding whether one or more base station identifications are included in the SYS_INFO field 1108A. In one embodiment, the BASE_ID_INCLUDED field 1226 is a single bit. In one embodiment, the BASE_ID_INCLUDED field 1226 is set to '1' if the information is included and is set to '0' if the information is not included.

The BASE_ID_COUNT field 1228 stores information regarding the number of base station identifiers stored within the SYS_INFO field 1108A. In one embodiment, the BASE_ID_COUNT field 1228 is eight bits. In one embodiment, when the BASE_ID_INCLUDED field 1226 is set to '0', the BASE_ID_COUNT field 1216 is excluded, i.e., zero bits.

The SYS_INFO field 1108A can have one or more BASE_ID fields 1230. In one embodiment, the SYS_INFO field 1108A has the number of BASE_ID fields 1230 specified in the BASE_ID_COUNT field 1228. Each BASE_ID field 1230 stores information regarding a base station identifier. In one embodiment, each BASE_ID field 1230 is sixteen bits. In one embodiment, when the BASE_ID_INCLUDED field 1226 is set to '0', there are no BASE_ID fields 1230.

The REG_ZONE_INCLUDED field 1232 stores information regarding whether a registration zone number is included in the SYS_INFO field 1108A. In one embodiment, the REG_ZONE_INCLUDED field 1232 is a single bit. In one embodiment, the REG_ZONE_INCLUDED field 1232 is set to '1' if the information is included and is set to '0' if the information is not included.

The REG_ZONE field 1234 stores information regarding a registration zone. In one embodiment, the REG_ZONE field 1212 stores an eight bit number. In one embodiment, when the REG_ZONE_INCLUDED field 1232 is set to '0', the REG_ZONE field 1204 is excluded, i.e., zero bits.

In one embodiment, the SYS_INFO field 1108A also includes RESERVED bits such that the length of the SYS_INFO field 1108A is an integer number of octets. In one embodiment, the RESERVED bits are all set to '0'.

As mentioned above, the structure of the SYS_INFO field 1108 can differ depending on the value of the SYS_TYPE field 1106. Another embodiment of an exemplary SYS_INFO field 1108B for which the SYS_TYPE field 1106 is set to HRPD is described with respect to FIG. 13.

The SUBNET_ID_COUNT field 1302 stores information regarding the number of subnet identifiers stored within the SYS_INFO field 1108B. In one embodiment, the SUBNET_ID_COUNT field 1302 is eight bits.

The SYS_INFO field 1108B can have one or more SUBNET_LENGTH fields 1304. In one embodiment, the SYS_INFO field 1108B has the number of SUBNET_LENGTH fields 1304 specified in the SUBNET_ID_COUNT field 1302. Each SUBNET_LENGTH field 1304 stores information regarding the length of a subnet identifier (also stored in the SYS_INFO field 1108B). In one embodiment, each SUBNET_LENGTH field 1304 stores information regarding the length of a subnet identifier in bits. In one embodiment, each SUBNET_LENGTH field 1304 is eight bits. In one embodiment, the maximum length of the SUBNET_ID is 128. Accordingly, in one embodiment, the values '10000001' (129) to '11111111' (255) of the SUBNET_LENGTH field 1304 are reserved.

The SYS_INFO field 1108B can have one or more SUBNET_ID fields 1306. In one embodiment, the SYS_INFO field 1108B has the number of SUBNET_ID fields 1306 specified in the SUBNET_ID_COUNT field 1302, with one SUBNET_ID field 1306 corresponding to each SUBNET_LENGTH field 1304. Each SUBNET_ID field stores information regarding a subnet identification. In one embodiment, each SUBNET_ID field 1306 is of a length specified by a corresponding SUBNET_LENGTH field 1304.

In one embodiment, the SYS_INFO field 1108B also includes RESERVED bits such that the length of the SYS_INFO field 1108B is an integer number of octets. In one embodiment, the RESERVED bits are all set to '0'.

Figure 14:
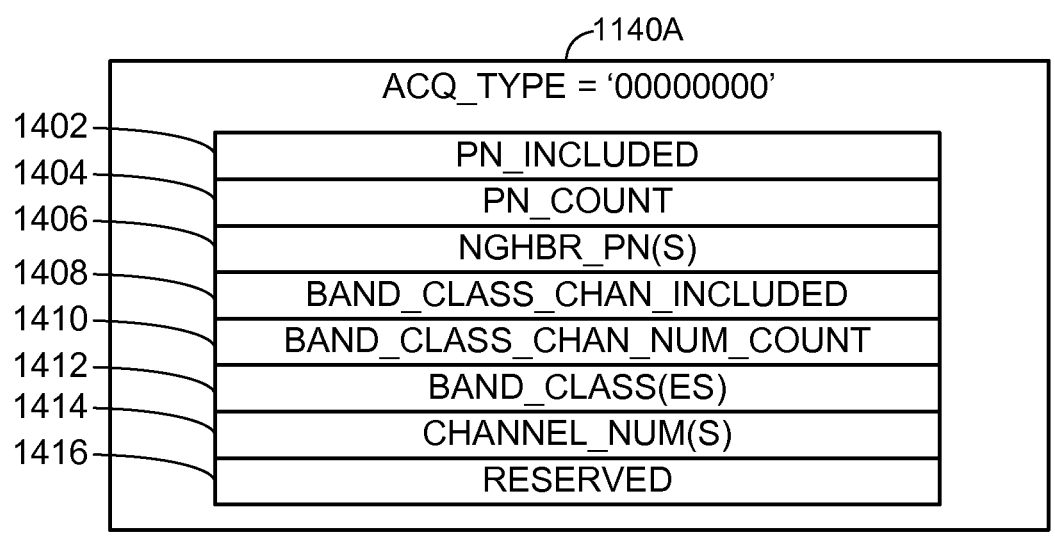
FIG. 14 is a diagram of an exemplary ACQ_INFO field for which the ACQ_TYPE field is set to cdma2000-1x or HRPD.

An exemplary ACQ_INFO field 1140A for which the ACQ_TYPE field 1138 is set to cdma2000-1x or HRPD is described with respect to FIG. 14. The ACQ_INFO field 1140A can be stored in a memory or other computer-readable medium. The ACQ_INFO field 1140A can be stored along with other fields in a user zone file in a user zone list. In one embodiment, the ACQ_INFO field 1140A includes a number of different fields as described further below. As mentioned above, the ACQ_INFO field 1140A can be structured differently depending on the value stored in the ACQ_TYPE field 1138.

The PN_INCLUDED field 1402 stores information regarding whether one or more PN offsets are included in the ACQ_INFO field 1140A. In one embodiment, the PN_INCLUDED field 1402 is a single bit. In one embodiment, the PN_INCLUDED field 1402 is set to '1' if the information is included and is set to '0' if the information is not included.

The PN_COUNT field 1404 stores information regarding the number of PN offsets stored within the ACQ_INFO field 1140A. In one embodiment, the PN_COUNT field 1404 is eight bits. In one embodiment, when the PN_INCLUDED field 1402 is set to '0', the PN_COUNT field 1404 is excluded, i.e., zero bits.

The ACQ_INFO field 1140A can have one or more NGHBR_PN fields 1406. In one embodiment, the ACQ_INFO field 1140A has the number of NGHBR_PN fields 1406 specified in the PN_COUNT field 1404. Each NGHBR_PN field 1406 stores information regarding a PN offset. In one embodiment, each NGHBR_PN field 1406 is set to a PN offset in units of 64 chips. In one embodiment, each NGHBR_PN field 1406 is nine bits. In one embodiment, when the PN_INCLUDED field 1402 is set to '0', there are no NGHBR_PN fields 1218.

The BAND_CLASS_CHAN_INCLUDED field 1408 stores information regarding whether one or more band classes and channel numbers are included in the ACQ_INFO field 1140A. In one embodiment, the BAND_CLASS_CHAN_INCLUDED field 1408 is a single bit. In one embodiment, the BAND_CLASS_CHAN_INCLUDED field 1408 is set to '1' if the information is included and is set to '0' if the information is not included.

The BAND_CLASS_CHAN_NUM_COUNT field 1410 stores information regarding the number of band classes and channel numbers stored within the ACQ_INFO field 1140A. In one embodiment, the BAND_CLASS_CHAN_NUM_COUNT field 1410 is eight bits. In one embodiment, when the BAND_CLASS_CHAN_INCLUDED field 1408 is set to '0', the PN_COUNT field 1404 is excluded, i.e., zero bits.

The ACQ_INFO field 1140A can have one or more BAND_CLASS fields 1412. In one embodiment, the ACQ_INFO field 1140A has the number of BAND_CLASS fields 1412 specified in the BAND_CLASS_CHAN_NUM_COUNT field 1410. Each BAND_CLASS field 1412 stores information regarding a band class. In one embodiment, each BAND_CLASS field 1412 is five bits. In one embodiment, when the BAND_CLASS_CHAN_INCLUDED field 1408 is set to '0', there are no BAND_CLASS fields 1218.

The ACQ_INFO field 1140A can have one or more CHAN_NUM fields 1414. In one embodiment, the ACQ_INFO field 1140A has the number of CHAN_NUM fields 1414 specified in the BAND_CLASS_CHAN_NUM_COUNT field 1410, each one corresponding to a BAND_CLASS field 1412. Each CHAN_NUM field 1414 stores information regarding a channel number corresponding to the band class specified by the corresponding BAND_CLASS field 1212. In one embodiment, each CHAN_NUM field 1412 is eleven bits. In one embodiment, when the BAND_CLASS_CHAN_INCLUDED field 1408 is set to '0', there are no CHAN_NUM fields 1218.

In one embodiment, the SYS_INFO field 1108B also includes RESERVED bits such that the length of the SYS_INFO field 1108B is an integer number of octets. In one embodiment, the RESERVED bits are all set to '0'.

Figure 15:
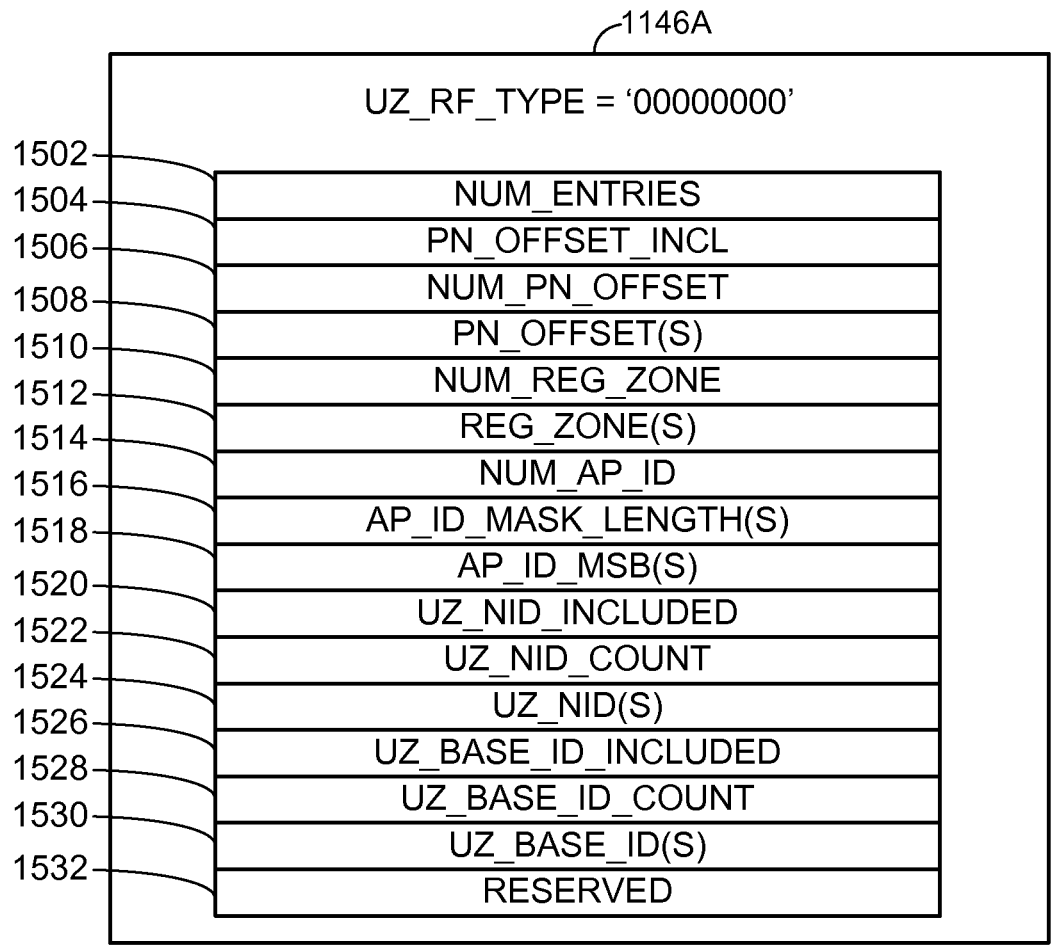
FIG. 15 is a diagram of an exemplary UZ_RF_INFO field for which the UZ_RF_TYPE field is set to cdma2000-1x.

An exemplary UZ_RF_INFO field 1146A for which the UZ_RF_TYPE field 1144 is set to cdma2000-1x is described with respect to FIG. 15. The UZ_RF_INFO field 1146A can be stored in a memory or other computer-readable medium. The UZ_RF_INFO field 1146A can be stored along with other fields in a user zone file in a user zone list. A user zone file can have multiple UZ_RF_INFO fields of different UZ_RF_TYPEs. In one embodiment, the UZ_RF_INFO field 1146A includes a number of different fields as described further below. As mentioned above, the UZ_RF_INFO field 1146A can be structured differently depending on the value stored in the UZ_RF_TYPE field 1144.

The NUM_ENTRIES field 1502 stores information regarding the number of entries in the UZ_RF_INFO field 1146A. For example, in one embodiment, each entry can have the fields described below from the PN_OFFSET_INCL field 1504 to the last of one or more UZ_BASE_ID fields 1530. In one embodiment, the NUM_ENTRIES field 1502 is four bits.

The PN_OFFSET_INCL field 1504 stores information regarding whether one or more PN offsets are included in a particular entry the UZ_RF_INFO field 1146A. In one embodiment, the PN_OFFSET_INCL field 1504 is a single bit. In one embodiment, the PN_OFFSET_INCL field 1504 is set to '1' if the information is included and is set to '0' if the information is not included.

The NUM_PN_OFFSET field 1506 stores information regarding the number of PN offsets stored within a particular entry in the UZ_RF_INFO field 1146A. In one embodiment, the NUM_PN_OFFSET field 1506 is three bits. In one embodiment, when the PN_OFF_SET_INCL field 1504 is set to '0', the NUM_PN_OFFSET field 1506 is excluded, i.e., zero bits.

Each entry in the UZ_RF_INFO field 1146A can have one or more PN_OFFSET fields 1508. In one embodiment, each entry in the UZ_RF_INFO field 1146A has the number of PN_OFFSET fields 1508 specified in the corresponding NUM_PN_OFFSET field 1506. Each PN_OFFSET field 1508 stores information regarding a PN offset, e.g., of an access point or a base station. In one embodiment, each PN_OFFSET field 1508 is nine bits. In one embodiment, when the corresponding PN_OFFSET_INCL field 1504 is set to '0', there are no PN_OFFSET fields 1508 in the entry.

The NUM_REG_ZONE field 1510 stores information regarding the number of registration zone numbers stored within a particular entry in the UZ_RF_INFO field 1146A. In one embodiment, the NUM_REG_ZONE field 1510 is two bits.

Each entry in the UZ_RF_INFO field 1146A can have one or more REG_ZONE fields 1512. In one embodiment, each entry in the UZ_RF_INFO field 1146A has the number of REG_ZONE fields 1512 specified in the corresponding NUM_REG_ZONE field 1510. Each REG_ZONE field 1512 stores information regarding a registration zone number, e.g., of an access point or a base station. In one embodiment, each REG_ZONE field 1512 is eight bits.

The NUM_AP_ID field 1514 stores information regarding the number of access point identifications stored within a particular entry in the UZ_RF_INFO field 1146A. In one embodiment, the NUM_AP_ID field 1514 is three bits.

Each entry in the UZ_RF_INFO field 1146A can have one or more AP_ID_MASK_LENGTH fields 1516. In one embodiment, each entry in the UZ_RF_INFO field 1146A has the number of AP_ID_MASK_LENGTH fields 1516 specified in the corresponding NUM_AP_ID field 1514. Each AP_ID_MASK_LENGTH field 1514 stores information regarding the number of bits which can identify a group of access points or a single access point. In one embodiment, the AP_ID_MASK_LENGTH field 1514 specifies the number of consecutive bits (starting from the most significant bits) of an access point identification (AP_ID). In one embodiment the AP_ID_MASK_LENGTH is transmitted in an overhead signaling message. In one embodiment the AP_ID_MASK_LENGTH field 1114 is eight bits. In one embodiment, if no AP_ID_MSB field 1518 is desired, the AP_ID_MASK_LENGTH field 1114 can be set to '00000000' (zero).

Each AP_ID_MSB field 1518 stores information regarding the most significant bits of an access point identification. The AP_ID_MSB field 1518 is as many bits as specified in the corresponding AP_ID_MASK_LENGTH field 1516 and the information in the AP_ID_MSB field 1518 is sufficient to identify a group of access points or a single access point. It is to be appreciated that in the case that the AP_ID_MASK_LENGTH field 1516 is set to the length of the AP_ID, the AP_ID_MSB field 1116 is equal to the AP_ID, which can be broadcast by a base station in an overhead signaling message.

The UZ_NID_INCLUDED field 1520 stores information regarding whether one or more network identifiers are included in a particular entry of the UZ_RF_INFO field 1146A. In one embodiment, the UZ_NID_INCLUDED field 1520 is a single bit. In one embodiment, the UZ_NID_INCLUDED field 1520 is set to '1' if the information is included and is set to '0' if the information is not included.

The UZ_NID_COUNT field 1522 stores information regarding the number of network identifiers stored within a particular entry in the UZ_RF_INFO field 1146A. In one embodiment, the UZ_NID_COUNT field 1522 is six bits. In one embodiment, when the UZ_NID_INCLUDED field 1520 is set to '0', the UZ_NID_COUNT field 1522 is excluded, i.e., zero bits.

Each entry in the UZ_RF_INFO field 1146A can have one or more UZ_NID fields 1524. In one embodiment, each entry in the UZ_RF_INFO field 1146A has the number of UZ_NID fields 1524 specified in the corresponding UZ_NID_COUNT field 1522. Each UZ_NID field 1524 stores information regarding a network identification. In one embodiment, each UZ_NID field 1524 is sixteen bits. In one embodiment, when the corresponding UZ_NID_INCLUDED field 1520 is set to '0', there are no UZ_NID fields 1524 in the entry.

The UZ_BASE_ID_INCLUDED field 1526 stores information regarding whether one or more base station identifiers are included in a particular entry of the UZ_RF_INFO field 1146A. In one embodiment, the UZ_BASE_ID_INCLUDED field 1526 is a single bit. In one embodiment, the UZ_BASE_ID_INCLUDED field 1526 is set to '1' if the information is included and is set to '0' if the information is not included.

The UZ_BASE_ID_COUNT field 1528 stores information regarding the number of base station identifiers stored within a particular entry in the UZ_RF_INFO field 1146A. In one embodiment, the UZ_BASE_ID_COUNT field 1522 is eight bits. In one embodiment, when the UZ_BASE_ID_INCLUDED field 1526 is set to '0', the UZ_BASE_ID_COUNT field 1528 is excluded, i.e., zero bits.

Each entry in the UZ_RF_INFO field 1146A can have one or more UZ_BASE_ID fields 1530. In one embodiment, each entry in the UZ_RF_INFO field 1146A has the number of UZ_BASE_ID fields 1530 specified in the corresponding UZ_BASE_ID_COUNT field 1528. Each UZ_BASE_ID field 1530 stores information regarding a base station identifier. In one embodiment, each UZ_BASE_ID field 1530 is sixteen bits. In one embodiment, when the corresponding UZ_BASE_ID_INCLUDED field 1526 is set to '0', there are no UZ_BASE_ID fields 1530 in the entry.

In one embodiment, the UZ_RF_INFO field 1146B also includes RESERVED bits such that the length of the UZ_RF_INFO field 1146B is an integer number of octets. In one embodiment, the RESERVED bits are all set to '0'. It is to be appreciated that, in one embodiment, each entry in the UZ_RF_INFO field 1146B does not have RESERVED bits, but that the UZ_RF_INFO field 1146B has RESERVED bits.

Figure 16:
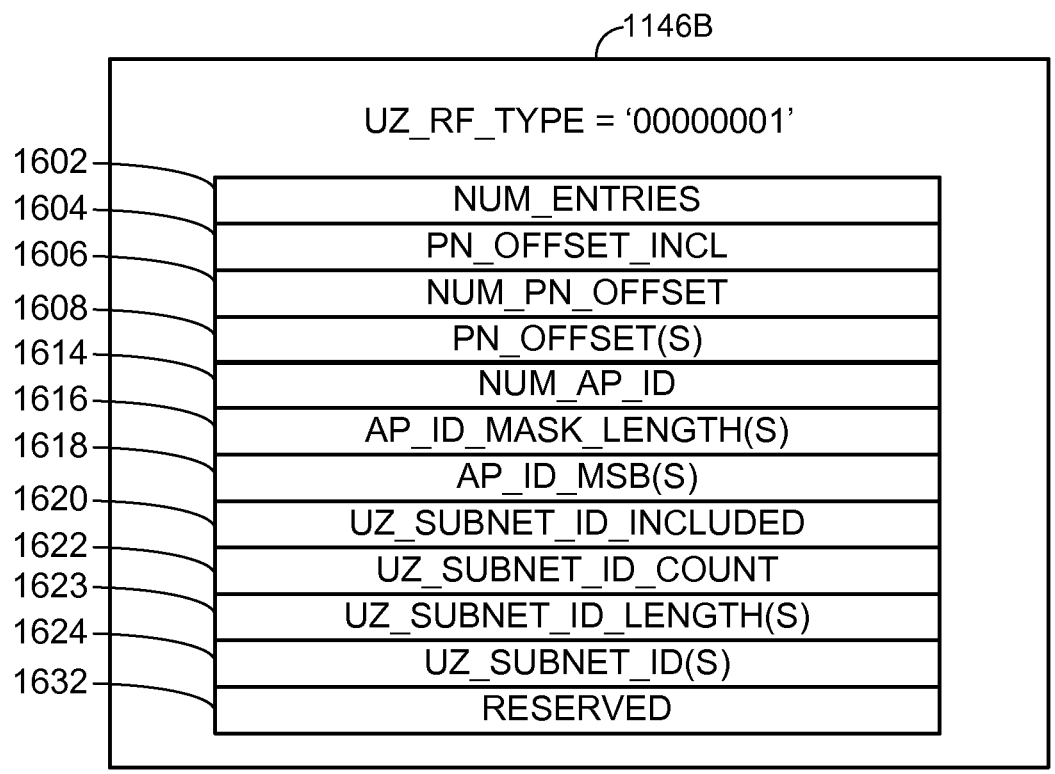
FIG. 16 is a diagram of an exemplary UZ_RF_INFO field for which the UZ_RF_TYPE field is set to HRPD.

An exemplary UZ_RF_INFO field 1146B for which the UZ_RF_TYPE field 1144 is set to HRPD is described with respect to FIG. 16. The UZ_RF_INFO field 1146B can be stored in a memory or other computer-readable medium. The UZ_RF_INFO field 1146B can be stored along with other fields in a user zone file in a user zone list. A user zone file can have multiple UZ_RF_INFO fields of different UZ_RF_TYPEs. In one embodiment, the UZ_RF_INFO field 1146B includes a number of different fields as described further below. As mentioned above, the UZ_RF_INFO field 1146B can be structured differently depending on the value stored in the UZ_RF_TYPE field 1144.

The NUM_ENTRIES field 1602 stores information regarding the number of entries in the UZ_RF_INFO field 1146B. For example, in one embodiment, each entry can have the fields described below from the PN_OFFSET_INCL field 1604 to the last of one or more UZ_SUBNET_ID fields 1624. In one embodiment, the NUM_ENTRIES field 1602 is four bits.

The PN_OFFSET_INCL field 1604 stores information regarding whether one or more PN offsets are included in a particular entry the UZ_RF_INFO field 1146B. In one embodiment, the PN_OFFSET_INC field 1604 is a single bit. In one embodiment, the PN_OFFSET_INCL field 1604 is set to '1' if the information is included and is set to '0' if the information is not included.

The NUM_PN_OFFSET field 1606 stores information regarding the number of PN offsets stored within a particular entry in the UZ_RF_INFO field 1146B. In one embodiment, the NUM_PN_OFFSET field 1606 is three bits. In one embodiment, when the PN_OFF_SET_INCL field 1604 is set to '0', the NUM_PN_OFFSET field 1606 is excluded, i.e., zero bits.

Each entry in the UZ_RF_INFO field 1146B can have one or more PN_OFFSET fields 1608. In one embodiment, each entry in the UZ_RF_INFO field 1146B has the number of PN_OFFSET fields 1608 specified in the corresponding NUM_PN_OFFSET field 1606. Each PN_OFFSET field 1608 stores information regarding a PN offset, e.g., of an access point or a base station. In one embodiment, each PN_OFFSET field 1608 is nine bits. In one embodiment, when the corresponding PN_OFFSET_INCL field 1604 is set to '0', there are no PN_OFFSET fields 1608 in the entry.

The NUM_AP_ID field 1614 stores information regarding the number of access point (AP) identifications stored within a particular entry in the UZ_RF_INFO field 1146B. In one embodiment, the NUM_AP_ID field 1614 is three bits.

Each entry in the UZ_RF_INFO field 1146B can have one or more AP_ID_MASK_LENGTH fields 1616. In one embodiment, each entry in the UZ_RF_INFO field 1146B has the number of AP_ID_MASK_LENGTH fields 1616 specified in the corresponding NUM_AP_ID field 1614. Each AP_ID_MASK_LENGTH field 1614 stores information regarding the number of bits which can identify a group of access points or a single access point. In one embodiment, the AP_ID_MASK_LENGTH field 1614 specifies the number of consecutive bits (starting from the most significant bits) of an access point identification (AP_ID). In one embodiment the AP_ID_MASK_LENGTH is transmitted in an overhead signaling message. In one embodiment the AP_ID_MASK_LENGTH field 1114 is eight bits. In one embodiment, if no AP_ID_MSB field 1618 is desired, the AP_ID_MASK_LENGTH field 1114 can be set to '00000000' (zero).

Each AP_ID_MSB field 1618 stores information regarding the most significant bits of an access point identification. The AP_ID_MSB field 1618 is as many bits as specified in the corresponding AP_ID_MASK_LENGTH field 1616 and the information in the AP_ID_MSB field 1618 is sufficient to identify a group of access points or a single access point. It is to be appreciated that in the case that the AP_ID_MASK_LENGTH field 1616 is set to the length of the AP_ID, the AP_ID_MSB field 1116 is equal to the AP_ID, which can be broadcast by a base station in an overhead signaling message.

The UZ_SUBNET_ID_INCLUDED field 1620 stores information regarding whether one or more subnet identifiers are included in a particular entry of the UZ_RF_INFO field 1146B. In one embodiment, the UZ_SUBNET_ID_INCLUDED field 1620 is a single bit. In one embodiment, the UZ_SUBNET_ID_INCLUDED field 1620 is set to '1' if the information is included and is set to '0' if the information is not included.

The UZ_SUBNET_ID_COUNT field 1622 stores information regarding the number of subnet identifiers stored within a particular entry in the UZ_RF_INFO field 1146B. In one embodiment, the UZ_SUBNET_ID_COUNT field 1622 is six bits. In one embodiment, when the UZ_SUBNET_ID_INCLUDED field 1620 is set to '0', the UZ_SUBNET_ID_COUNT field 1622 is excluded, i.e., zero bits.

Each entry in the UZ_RF_INFO field 1146B can have one or more UZ_SUBNET_ID_LENGTH fields 1623. In one embodiment, each entry in the UZ_RF_INFO field 1146B has the number of UZ_SUBNET_ID_LENGTH fields 1623 specified in the corresponding UZ_SUBNET_ID_COUNT field 1622. Each UZ_SUBNET_ID_LENGTH field 1623 stores information regarding the length of a subnet identifier (also stored in entry of the UZ_RF_INFO field 1148B). In one embodiment, the maximum length of the UZ_SUBNET_ID is 128. Accordingly, in one embodiment, the values '10000001' (129) to '11111111' (255) of the UZ_SUBNET_ID_LENGTH field 1623 are reserved.

Each entry in the UZ_RF_INFO field 1146B can have one or more UZ_SUBNET_ID fields 1624. In one embodiment, each entry in the UZ_RF_INFO field 1146B has the number of UZ_SUBNET_ID fields 1624 specified in the corresponding UZ_SUBNET_ID_COUNT field 1622. Each UZ_SUBNET_ID field 1624 stores information regarding a subnet identification. In one embodiment, each UZ_SUBNET_ID field 1624 is of a length, in bits, as specified by the corresponding UZ_SUBNET_ID_LENGTH field 1623. In one embodiment, when the corresponding UZ_SUBNET_ID_INCLUDED field 1620 is set to '0', there are no UZ_SUBNET_ID fields 1624 in the entry.

In one embodiment, the UZ_RF_INFO field 1146B also includes RESERVED bits such that the length of the UZ_RF_INFO field 1146B is an integer number of octets. In one embodiment, the RESERVED bits are all set to '0'. It is to be appreciated that, in one embodiment, each entry in the UZ_RF_INFO field 1146B does not have RESERVED bits, but that the UZ_RF_INFO field 1146B has RESERVED bits.

Figure 17:
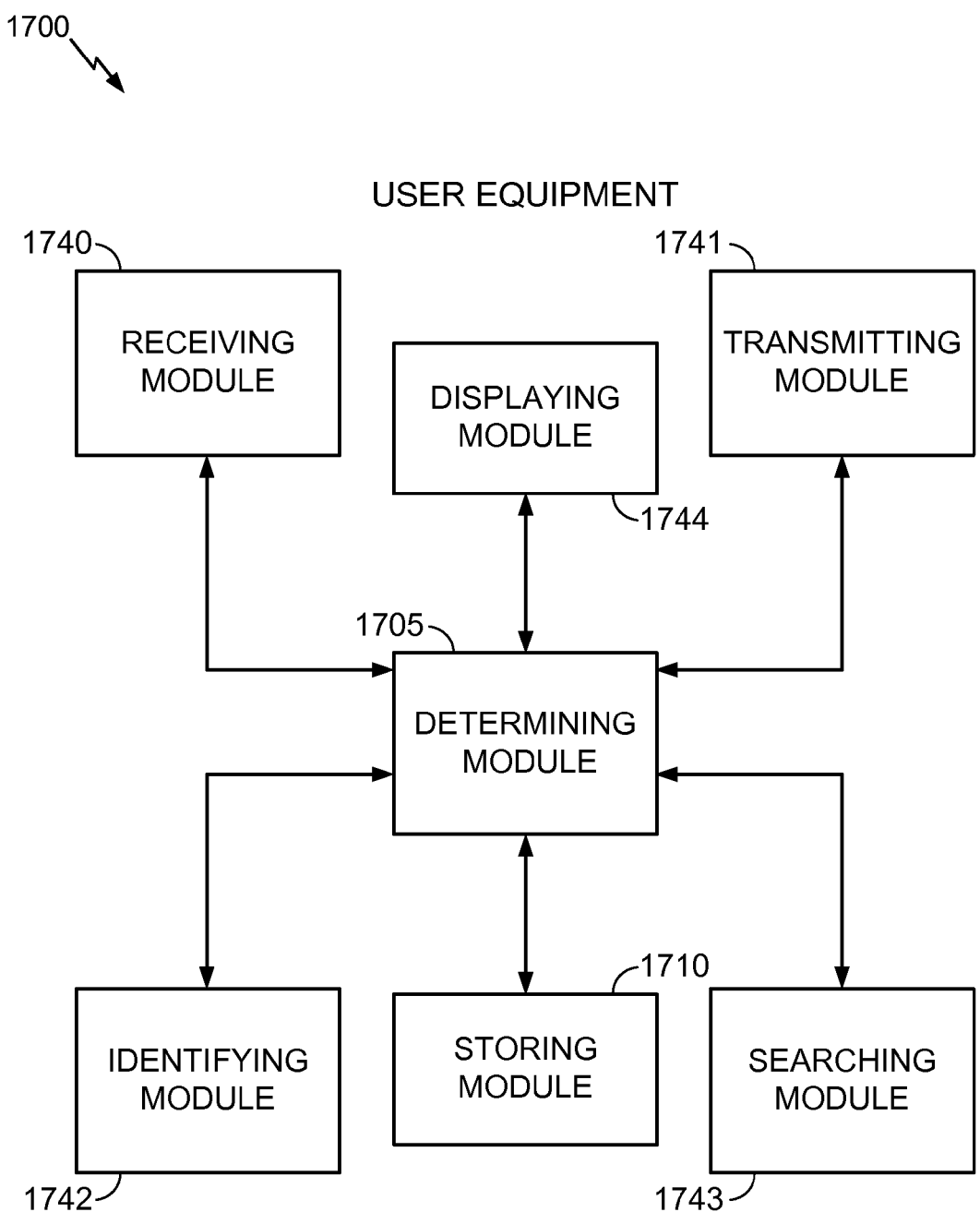
FIG. 17 is a functional block diagram of another exemplary user equipment.

The functionality described herein (e.g., with regard to one or more of the accompanying figures) may correspond in some aspects to similarly designated "means for" functionality in the appended claims. Referring to FIG. 17, the user equipment 1700 is represented as a series of interrelated functional modules.

As shown, the UE 1700 may comprise a determining module 1705, a storing module 1710, a receiving module 1740, a transmitting module 1741, an identifying module 1742, a searching module 1743, and a displaying module 1744. The determining module 1705 may correspond at least in some aspects to, for example, a processor or a processing module as discussed herein. The determining module 1705 can, for example, determine one or more communication interface types for a femto node. The determining module 1705 can, for example, determine that an electronic device is within a user zone associated with a femto node, determine or more user zones for a femto node, determine a first user zone having a first user zone communication interface type and a second user zone having a second user zone communication interface type, or determine a first communication interface type for a femto node and a second communication interface type for a femto node which is different from the first interface type.

The storing module 1710 may correspond at least in some aspects to, for example, a memory or a storing module as discussed herein. The storing module 1710 can, for example, store information regarding a determined communication interface type in a user zone list. The storing module 1710 can, for example, store information regarding one or more user zones in a user zone list, user zone communication zone types, a first user zone and a second user zone, a reference to a user zone, a user zone list, a user zone file, or a communication interface type.

The receiving module 1740 may correspond at least in some aspects to, for example, a receiver or a receiving module as discussed herein. The transmitting module 1741 may correspond at least in some aspects to, for example, a transmitter or a transmitting module as discussed herein. The identifying module 1742 may correspond at least in some aspects to, for example, a processor or a processing module as discussed herein. The displaying module 1744 may correspond at least in some aspects to, for example, a display as discussed herein.

The searching module 1743 may correspond at least in some aspects to, for example, a receiver or a receiving module as discussed herein. The searching module 1743 can, for example, search or scan for a particular femto node. The searching module 1743 can, for example, search or scan for multiple femto nodes or search or scan for unknown femto nodes.

The functionality of the modules of FIG. 17 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

The embodiments presented herein and other embodiments are further described in greater detail in the attached Appendix. While the specification describes particular examples of the present invention, those of ordinary skill can devise variations of the present invention without departing from the inventive concept. For example, the teachings herein refer to circuit-switched network elements but are equally applicable to packet-switched domain network elements.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. For example, although much of the above is directed to embodiments in which stored user zone information refers to a femto node, it to be appreciated that other the stored user zone information can refer to any access node, including, but not limited to, a macro node, a pico node, a femto node, a WiMax gateway, or a WiFi access point. Thus, the present invention is not intended to be limited to the examples shown herein but is to be accorded the widest scope consistent with the principles and novel features disclosed herein.

What is claimed is:

1. A method of storing information in a user zone list, the method comprising:
    determining, at an access terminal, two or more communication interface types for an access node;
    determining, at the access terminal and based at least in part on one or more current conditions determined at the access terminal following detection of the access node, one or more user zones associated with the access node; and
    storing in the user zone list, for each of the one or more user zones, a respective user zone file for each of the two or more communication interface types based at least in part on determining the two or more communication interface types and determining the one or more user zones,
    wherein each user zone file includes respective information regarding a corresponding one of the two or more communication interface types of the access node, wherein the communication interface type of each of the two or more user zone files is indicated by one of a plurality of indicators that each correspond to one of a plurality of communication interface types.

2. The method of claim 1, further comprising:
    determining that the access terminal is within one of the one or more user zones associated with the access node; and
    searching for the access node.

3. The method of claim 2, wherein the one of the one or more user zones comprises one or more criteria associated with the access node.

4. The method of claim 1, wherein the plurality of communication interface types include at least cdma2000-1×, HRPD, GSM, UMTS, UMB, WiMAX, or LTE.

5. The method of claim 1, further comprising:
    storing information regarding the one or more user zones in the user zone list.

6. The method of claim 5, wherein the information regarding the one or more user zones comprises one or more geographical areas.

7. The method of claim 5, wherein the information regarding the one or more user zones comprises a pseudonoise offset.

8. The method of claim 5, wherein the information regarding the one or more user zones comprises a time difference between two received reference signals.

9. The method of claim 5, wherein the information regarding the one or more user zones comprises a subnet identifier.

10. The method of claim 5, further comprising storing, in the user zone list, information regarding a number of user zones determined for the access node.

11. The method of claim 1, wherein the two or more communication interface types for the access node are different from one another.

12. The method of claim 1, wherein determining the one or more user zones associated with the access node further comprises:
    determining a first user zone for the access node having a first user zone communication interface type;
    determining a second user zone for the access node having a second user zone communication interface type different than the first communication interface type;
    storing information regarding the first user zone in the user zone list; and
    storing information regarding the second user zone in the user zone list, wherein the information regarding the second user zone comprises a reference to the information regarding the first user zone.

13. The method of claim 1, wherein determining two or more communication interface types for the access node comprises determining a first communication interface type and determining a second communication interface type different than the first communication interface type, and wherein storing information regarding the determined communication interface types comprises storing information regarding the first communication interface type in a first user zone file in the user zone list and storing information regarding the second communication interface type in a second user zone file of the user zone list.

14. The method of claim 13, wherein the second user zone file comprises a reference to the first user zone file.

15. The method of claim 1, wherein the user zone list comprises data structures with information regarding one or more user zones.

16. The method of claim 1, wherein each user zone file comprises information regarding a particular access node and one or more user zones associated with the particular access node.

17. An apparatus for storing information in a user zone list, the apparatus comprising:
    a processor configured to determine two or more communication interface types for an access node, and determine, based at least in part on one or more current conditions determined at the apparatus following detection of the access node, one or more user zones associated with the access node; and
    a memory configured to store in the user zone list, for each of the one or more user zones, a respective user zone file for each of the two or more communication interface types based at least in part on determining the two or more communication interface types and determining the one or more user zones,
    wherein each user zone file includes respective information regarding a corresponding one of the two or more communication interface types of the access node, wherein the communication interface type of each of the two or more user zone files is indicated by one of a plurality of indicators that each correspond to one of a plurality of communication interface types.

18. The apparatus of claim 17, wherein the processor is further configured to determine that the apparatus is within one of the one or more user zones associated with the access node and to search for the access node.

19. The apparatus of claim 18, wherein the one of the one or more user zones comprises one or more criteria associated with the access node.

20. The apparatus of claim 17, wherein the communication interface types include at least cdma2000-1×, HRPD, GSM, UMTS, UMB, WiMAX, or LTE.

21. The apparatus of claim 17, wherein the memory is configured to store information regarding the one or more user zones in the user zone list.

22. The apparatus of claim 21, wherein the information regarding the one or more user zones comprises one or more geographical areas.

23. The apparatus of claim 21, wherein the information regarding the one or more user zones comprises a pseudonoise offset.

24. The apparatus of claim 21, wherein the information regarding the one or more user zones comprises a time difference between two received reference signals.

25. The apparatus of claim 21, wherein the information regarding the one or more user zones comprises a subnet identifier.

26. The apparatus of claim 21, wherein the memory is configured to store, in the user zone list, information regarding a number of user zones determined for the access node.

27. The apparatus of claim 17, wherein at least one of the two or more communication interface types for the access node are different from one another.

28. The apparatus of claim 17, wherein the processor configured to determine one or more user zones associated with the access node is further configured to determine a first user zone for the access node having a first user zone communication interface type and to determine a second user zone for the access node having a second user zone communication interface type different than the first communication interface type and wherein the memory is configured to store information regarding the first user zone in the user zone list and store information regarding the second user zone in the user zone list, wherein the information regarding the second user zone comprises a reference to the information regarding the first user zone.

29. The apparatus of claim 17, wherein the processor is configured to determine a first communication interface type and to determine a second communication interface type different than the first communication interface type and wherein the memory is configured to store information regarding the first communication interface type in a first user zone file in the user zone list and to store information regarding the second communication interface type in a second user zone file of the user zone list.

30. The apparatus of claim 29, wherein the second user zone file comprises a reference to the first user zone file.

31. The apparatus of claim 17, wherein the user zone list comprises data structures with information regarding one or more user zones.

32. The apparatus of claim 17, wherein each user zone file comprises information regarding a particular access node and one or more user zones associated with the particular access node.

33. A computer program product comprising:
a non-transitory computer readable medium, comprising:
code for causing a computer to determine, at an access terminal, two or more communication interface types for an access node;
code for causing the computer to determine, at the access terminal and based at least in part on one or more current conditions determined at the access terminal following detection of the access node, one or more user zones associated with the access node; and
code for causing the computer to store in the user zone list, for each of the one or more user zones, a respective user zone file for each of the two or more communication interface types based at least in part on determining the two or more communication interface types and determining the one or more user zones,
wherein each user zone file includes respective information regarding a corresponding one of the two or more communication interface types of the access node, wherein the communication interface type of each of the two or more user zone files is indicated by one of a plurality of indicators that each correspond to one of a plurality of communication interface types.

34. The computer program product of claim 33, wherein the computer readable medium further comprises:
code for causing the computer to determine that the access terminal is within one of the one or more user zone zones associated with the access node; and
code for causing the computer to search for the access node.

35. The computer program product of claim 33, wherein the communication interface types include at least cdma2000-1x, HRPD, GSM, UMTS, UMB, WiMAX, or LTE.

36. The computer program product of claim 33, wherein the computer readable medium further comprises:
code for causing the computer to store information regarding the one or more user zones in the user zone list.

37. The computer program product of claim 36, wherein the information regarding the one or more user zones comprises one or more geographical areas.

38. The computer program product of claim 36, wherein the information regarding the one or more user zones comprises a pseudonoise offset.

39. The computer program product of claim 36, wherein the information regarding the one or more user zones comprises a time difference between two received reference signals.

40. The computer program product of claim 36, wherein the information regarding the one or more user zones comprises a subnet identifier.

41. The computer program product of claim 36, wherein the computer readable medium further comprises code for causing the computer to store, in the user zone list, information regarding a number of user zones determined for the access node.

42. The computer program product of claim 33, wherein the two or more communication interface types for the access node are different from one another.

43. The computer program product of claim 33, wherein the code for causing the computer to determine the one or more user zones associated with the access node further comprises:
code for causing the computer to determine a first user zone for the access node having a first user zone communication interface type;
code for causing the computer to determine a second user zone for the access node having a second user zone communication interface type different than the first communication interface type;
code for causing the computer to store information regarding the first user zone in the user zone list; and
code for causing the computer to store information regarding the second user zone in the user zone list, wherein the information regarding the second user zone comprises a reference to the information regarding the first user zone.

44. The computer program product of claim 33, wherein the code for causing the computer to determine two or more communication interface types for the access node comprises code for causing the computer to determine a first communication interface type and a second communication interface type different than the first communication interface type, and wherein the code for causing the computer to store information regarding the determined communication interface types comprises code for causing the computer to store information regarding the first communication interface type in a first user zone file in the user zone list and store information regarding the second communication interface type in a second user zone file of the user zone list.

45. The computer program product of claim 44, wherein the second user zone file comprises a reference to the first user zone file.

46. An apparatus for storing information in a user zone list, the apparatus comprising:
- means for determining, at an access terminal, two or more communication interface types for an access node;
- means for determining, at the access terminal and based at least in part on one or more current conditions determined at the access terminal following detection of the access node, one or more user zones associated with the access node; and
- means for storing in the user zone list, for each of the one or more user zones, a respective user zone file for each of the two or more communication interface types based at least in part on determining the two or more communication interface types and determining the one or more user zones,
- wherein each user zone file includes respective information regarding a corresponding one of the two or more communication interface types of the access node, wherein the communication interface type of each of the two or more user zone files is indicated by one of a plurality of indicators that each correspond to one of a plurality of communication interface types.

47. The apparatus of claim 46, further comprising:
- means for determining that the access terminal is within one of the one of more user zone zones associated with the access node; and
- means for searching for the access node.

48. The apparatus of claim 46, wherein the communication interface types include at least cdma2000-1x, HRPD, GSM, UMTS, UMB, WiMAX, or LTE.

49. The apparatus of claim 46, further comprising:
- means for storing information regarding the one or more user zones in the user zone list.

50. The apparatus of claim 49, wherein the information regarding the one or more user zones comprises one or more geographical areas.

51. The apparatus of claim 49, wherein the information regarding the one or more user zones comprises a pseudonoise offset.

52. The apparatus of claim 49, wherein the information regarding the one or more user zones comprises a time difference between two received reference signals.

53. The apparatus of claim 49, wherein the information regarding the one or more user zones comprises a subnet identifier.

54. The apparatus of claim 49, further comprising means for storing, in the user zone list, information regarding a number of user zones determined for the access node.

55. The apparatus of claim 46, wherein the two or more communication interface types for the access node are different from one another.

56. The apparatus of claim 46, wherein the means for determining the one or more user zones associated with the access node further comprises:
- means for determining a first user zone for the access node having a first user zone communication interface type;
- means for determining a second user zone for the access node having a second user zone communication interface type different than the first communication interface type;
- means for storing information regarding the first user zone in the user zone list; and
- means for storing information regarding the second user zone in the user zone list, wherein the information regarding the second user zone comprises a reference to the information regarding the first user zone.

57. The apparatus of claim 46, wherein the means for determining two or more communication interface types for the access node comprises means for determining a first communication interface type and means for determining a second communication interface type different than the first communication interface type, and wherein the means for storing information regarding the determined communication interface types comprises means for storing information regarding the first communication interface type in a first user zone file in the user zone list and means for storing information regarding the second communication interface type in a second user zone file of the user zone list.

58. The apparatus of claim 57, wherein the second user zone file comprises a reference to the first user zone file.

* * * * *